United States Patent
Kobayashi et al.

(10) Patent No.: US 9,547,461 B2
(45) Date of Patent: Jan. 17, 2017

(54) INFORMATION DELIVERY SYSTEM, INFORMATION PROCESSING APPARATUS, AND INFORMATION DELIVERY METHOD

(71) Applicants: Hiroto Kobayashi, Saitama (JP); Masahide Nishio, Kanagawa (JP)

(72) Inventors: Hiroto Kobayashi, Saitama (JP); Masahide Nishio, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/640,401

(22) Filed: Mar. 6, 2015

(65) Prior Publication Data
US 2015/0254026 A1    Sep. 10, 2015

(30) Foreign Application Priority Data

Mar. 10, 2014  (JP) .................... 2014-046949
Feb. 16, 2015  (JP) .................... 2015-027852

(51) Int. Cl.
*G06F 3/12*    (2006.01)
*H04N 1/00*    (2006.01)
*G06K 15/00*   (2006.01)

(52) U.S. Cl.
CPC .......... *G06F 3/1204* (2013.01); *G06F 3/1206* (2013.01); *G06F 3/1228* (2013.01); *G06F 3/1245* (2013.01);
(Continued)

(58) Field of Classification Search
CPC .... G06F 3/1204; G06F 3/1206; G06F 3/1228; G06F 3/1245; G06F 3/1247; G06F 3/1248
(Continued)

(56) References Cited

U.S. PATENT DOCUMENTS

2002/0131069 A1*  9/2002  Wanda ................... G06F 3/121
                                                           358/1.14
2003/0174360 A1*  9/2003  Ohshima ............... G06F 3/1203
                                                           358/1.15
(Continued)

FOREIGN PATENT DOCUMENTS

JP    2011257957 A  * 12/2011
JP    2013-182563      9/2013
(Continued)

*Primary Examiner* — Chad Dickerson
(74) *Attorney, Agent, or Firm* — Oblon, McClelland, Maier & Neustadt, L.L.P.

(57) ABSTRACT

An information delivery system includes plural plug-ins, a receiving unit, a destination-identifying information acquiring unit, a data-format information acquiring unit, a selecting unit, and a delivery unit. The plural plug-ins respectively correspond to plural types of devices. Each plug-in controls storage of data format information indicative of a format usable in a corresponding type of device and destination identifying information indicative of a destination device and transmitting data to the device. The receiving unit receives a data transmission request. The destination-identifying information acquiring unit acquires the destination identifying information from the plug-in. The data-format information acquiring unit acquires the data format information from the plug-ins. The selecting unit receives a selection of destination identifying information acquired. The delivery unit delivers, by using the plug-ins, data converted into the data format identified by the data format information acquired to the destination device identified by the destination identifying information selected.

20 Claims, 17 Drawing Sheets

(52) U.S. Cl.
CPC ........... *G06F 3/1247* (2013.01); *G06F 3/1288* (2013.01); *G06F 3/1292* (2013.01); *H04N 1/00* (2013.01)

(58) Field of Classification Search
USPC .......................... 358/1.11–1.18, 1.1, 1.9, 2.1
See application file for complete search history.

(56) References Cited

U.S. PATENT DOCUMENTS

| | | | |
|---|---|---|---|
| 2003/0179402 A1* | 9/2003 | Sandfort | G06F 3/1204 358/1.15 |
| 2010/0302589 A1* | 12/2010 | Kobayashi | G06F 3/1225 358/1.15 |
| 2011/0058199 A1 | 3/2011 | Kobayashi | |
| 2011/0286036 A1 | 11/2011 | Kobayashi | |
| 2012/0140269 A1 | 6/2012 | Kobayashi | |
| 2012/0236346 A1* | 9/2012 | Miyabe | G06F 9/44526 358/1.13 |
| 2013/0044335 A1 | 2/2013 | Kobayashi | |
| 2013/0094056 A1 | 4/2013 | Kobayashi | |
| 2013/0169987 A1* | 7/2013 | Akiyama | G06F 9/44505 358/1.13 |
| 2013/0232239 A1 | 9/2013 | Akiyama | |
| 2013/0235422 A1 | 9/2013 | Nakata | |
| 2013/0250331 A1 | 9/2013 | Kobayashi | |
| 2014/0063522 A1 | 3/2014 | Kobayashi | |

FOREIGN PATENT DOCUMENTS

| | | |
|---|---|---|
| JP | 2013-186824 | 9/2013 |
| JP | 2014-63477 A | 4/2014 |

* cited by examiner

FIG.5

| ID | NAME | ADDRESS |
|---|---|---|
| 000A1 | A's TABLET | 123.456.789.XXX |
| 000A2 | B's SMARTPHONE | 123.456.789.YYY |
| 000A3 | C's SMARTPHONE | 123.456.789.ZZZ |

FIG.6

| | NAME | STATUS |
|---|---|---|
| PLUG-IN A | CONFERENCE SYSTEM | ENABLED |
| PLUG-IN B | SMART DEVICE | ENABLED |
| PLUG-IN C | PRINTER | DISABLED |

FIG.9

| No | NAME | ENABLED/ DISABLED | SETTING |
|---|---|---|---|
| DESTINATION DEVICE MANAGEMENT | | | |
| 1 | SMART DEVICE | ☑ | SETTING |
| 2 | CONFERENCE SYSTEM | ☑ | SETTING |
| 3 | CLOUD SERVICE SYSTEM | ☐ | SETTING |
| ADD DESTINATION DEVICE | | OK | CANCEL |

| NOTICE SOURCE ADDRESS | NOTICE SOURCE PLUG-IN | NOTICE DESTINATION ADDRESS |
|---|---|---|
| 123.456.789.AAA | B | 123.456.789.XXX |
| ⋮ | ⋮ | ⋮ |

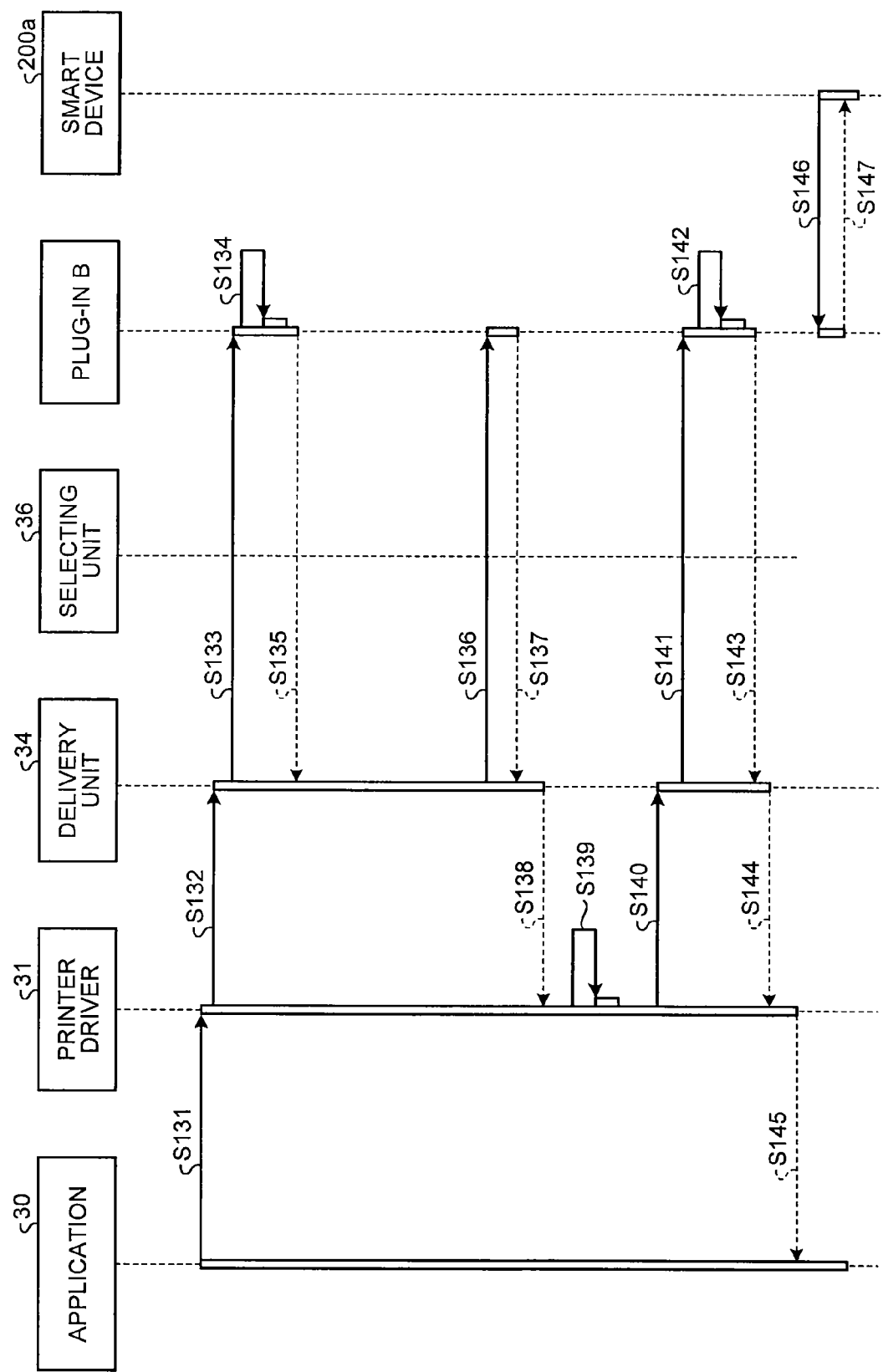

INFORMATION DELIVERY SYSTEM, INFORMATION PROCESSING APPARATUS, AND INFORMATION DELIVERY METHOD

CROSS-REFERENCE TO RELATED APPLICATIONS

The present application claims priority to and incorporates by reference the entire contents of Japanese Patent Application No. 2014-046949 filed in Japan on Mar. 10, 2014 and Japanese Patent Application No. 2015-027852 filed in Japan on Feb. 16, 2015.

BACKGROUND OF THE INVENTION

1. Field of the Invention

The present invention relates to an information delivery system, an information processing apparatus, and an information delivery method.

2. Description of the Related Art

A printer driver normally has a role to convert print data received from an application into data having a format with which a printer can print out data, and to transmit the converted data to the printer. Recently, there has also been a printer driver (digitizing driver) that converts print data received from an application into data having a format of image data (an image file). Examples of the format of image data to convert include a PDF format, an XPS format, a TIFF format, and a JPEG format.

Furthermore, a technology referred to as a virtualization driver is known. The virtualization driver converts print data received from an application into intermediate data (in an EMF format, for example), and transmits the converted intermediate data to a printer driver (real driver) that actually performs printing. The printer driver (real driver) that actually performs printing is a printer driver that converts the intermediate data into data having a format with which a printer can print out data. This enables a user, by only performing printing to a single printer driver (virtualization driver), to change printers (real drivers) for each print job to output. Moreover, because a printer driver to which a virtualization driver transmits intermediate data is not always such a printer driver that converts the intermediate data into printing data, it is also possible to digitize the print data by transmitting the intermediate data to a digitizing driver.

Japanese Patent Application Laid-open No. 2013-186824 discloses a printing system in which an information processing apparatus notifies a smart device of a print job generated by a printer driver of the information processing apparatus and acquires the setting for the print job and information about a printer of an output destination from the smart device.

However, it has not been possible for users to transmit image data to various devices including a printer by the same unified operation as a printing operation, without being conscious of a usable format of image data. That is, in the conventional technology, the user has needed to take the trouble of converting image data into the image data in a format usable in a destination device by a data conversion application or the like in advance and then starting up a transmission application or the like corresponding to the device to transmit the converted data.

Therefore, there is a need for an information delivery system, an information processing apparatus, and an information delivery method that allow the user to transmit data to various devices including a printer by the same unified operation as a printing operation without being conscious of a usable format of data.

SUMMARY OF THE INVENTION

It is an object of the present invention to at least partially solve the problems in the conventional technology.

According to an embodiment, an information delivery system delivers information to a plurality of types of devices, and includes a plurality of plug-ins, a receiving unit, a destination-identifying information acquiring unit, a data-format information acquiring unit, a selecting unit, and a delivery unit. The plug-ins respectively correspond to the plurality of types of devices. Each plug-in controls storage of data format information indicative of one or more data formats usable in a corresponding type of device and one or more pieces of destination identifying information indicative of destination devices and transmitting data to the device. The receiving unit receives a data transmission request. The destination-identifying information acquiring unit acquires the destination identifying information from one or more plug-ins out of the plurality of plug-ins. The data-format information acquiring unit acquires the data format information from one or more plug-ins out of the plurality of plug-ins. The selecting unit receives a selection of one or more pieces of destination identifying information out of the one or more pieces of destination identifying information acquired by the destination-identifying information acquiring unit. The delivery unit delivers, by using the plug-ins, one or more pieces of data converted into one or more data formats identified by the data format information acquired by the data-format information acquiring unit to one or more destination devices identified by the one or more pieces of destination identifying information selected by the selecting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table illustrating an example of destination identifying information on a plug-in B in the first embodiment;

FIG. 6 is a table illustrating an example of plug-in information in the first embodiment;

FIG. 9 is a diagram illustrating an example of a management screen for destination devices in the first embodiment;

FIG. 23 is a diagram illustrating an example of a sequence performed in the information delivery method in the fourth embodiment.

DETAILED DESCRIPTION OF THE PREFERRED EMBODIMENTS

In the following, exemplary embodiments of an information delivery system, an information processing apparatus, an information delivery method, and a computer program will be described in detail with reference to the accompanying drawings.

First Embodiment

Figure 1:
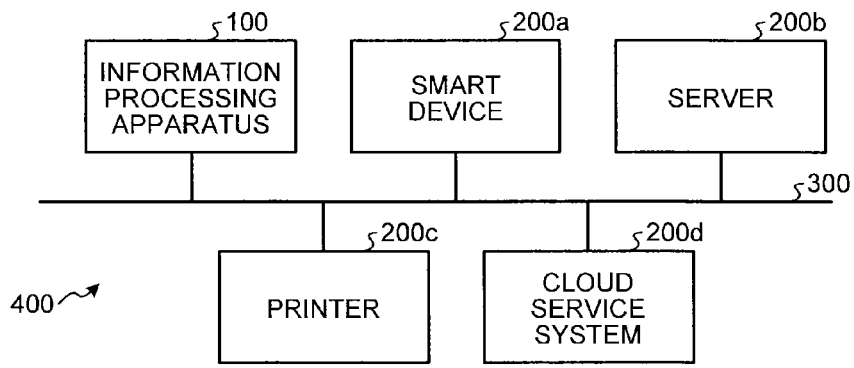
FIG. 1 is a block diagram illustrating an example of the configuration of an information delivery system according to a first embodiment.

The configuration of an information delivery system according to a first embodiment will be described first. FIG. 1 is a block diagram illustrating an example of the configuration of an information delivery system 400 in the first embodiment. The information delivery system 400 in the first embodiment includes an information processing apparatus 100, a smart device 200a, a server 200b, a printer 200c, and a cloud service system 200d. The information processing apparatus 100, the smart device 200a, the server 200b, the printer 200c, and the cloud service system 200d are connected to one another via a network 300. In the information delivery system 400 in the first embodiment, the information processing apparatus 100 transmits data (for example, image data) to various devices (the smart device 200a, the server 200b, the printer 200c, and the cloud service system 200d) via the network 300. In the following description, when the type of device is not distinguished, the device is simply referred to as a device 200.

Specific examples of the respective devices in FIG. 1 will be described. The information processing apparatus 100 is a personal computer and the like. The smart device 200a is a smartphone, a tablet terminal, and the like. The server 200b is a device to which electronic data (such as image data), which is referred to by a conference system and the like implemented with a plurality of terminals, is uploaded. The printer 200c is a printer, a multi-function printer (MFP), and the like. The cloud service system 200d is a system that implements on the Internet a service using uploaded electronic data. The cloud service system 200d is Dropbox (registered trademark) and SkyDrive (registered trademark), for example.

Figure 2:
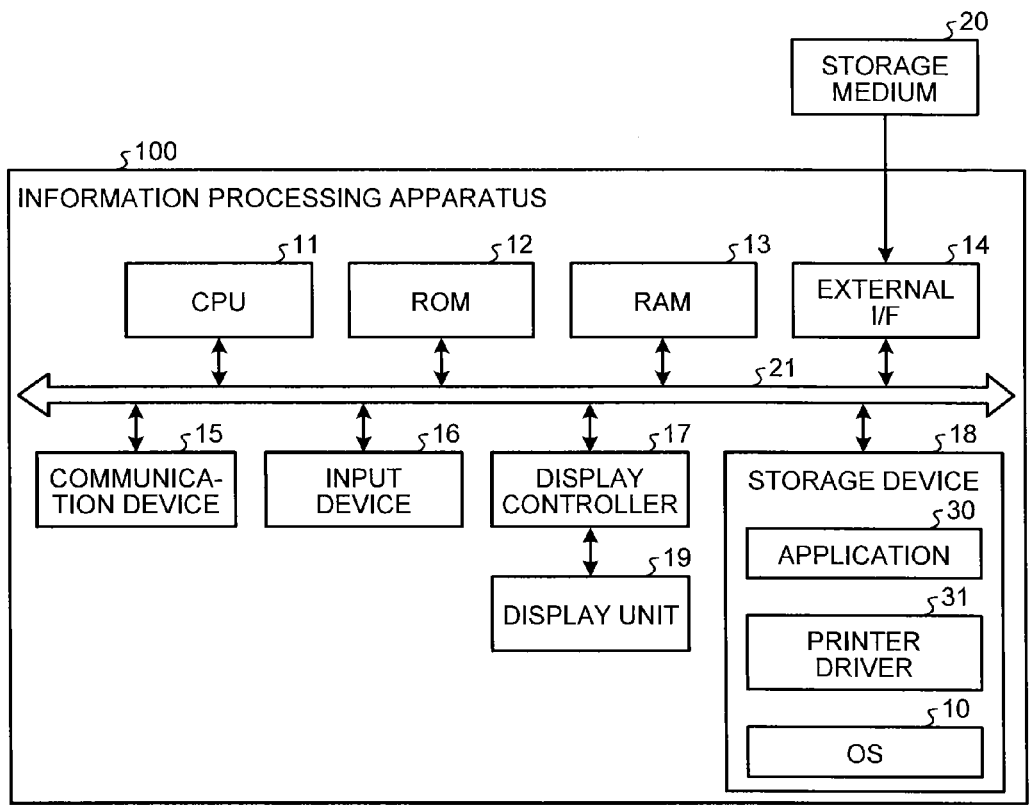
FIG. 2 is a block diagram illustrating an example of the hardware configuration of an information processing apparatus in the first embodiment.

Next, the hardware configuration of the information processing apparatus 100 will be described. FIG. 2 is a block diagram illustrating an example of the hardware configuration of the information processing apparatus 100 in the first embodiment. The information processing apparatus 100 in the first embodiment includes a central processing unit (CPU) 11, a read only memory (ROM) 12, a random access memory (RAM) 13, an external interface (I/F) 14, a communication device 15, an input device 16, a display controller 17, a storage device 18, and a display unit 19. The CPU 11, the ROM 12, the RAM 13, the external I/F 14, the communication device 15, the input device 16, the display controller 17, and the storage device 18 are connected to one another via a bus 21.

The CPU 11 is a device that controls the operation of the information processing apparatus 100. The ROM 12 is a read-only non-volatile storage medium. The ROM 12 stores therein programs such as firmware. The RAM 13 is a volatile storage medium capable of fast reading and writing of information. The RAM 13 is used as a work area when the CPU 11 processes information. The external I/F 14 is an interface to connect an external device such as a storage medium 20 to the bus 21. The communication device 15 performs communication with the other devices 200 via the network 300. The input device 16 is a user interface for a user to input information to the information processing apparatus 100. The input device 16 is a keyboard and a mouse, for example. The display controller 17 controls the display of the display unit 19. The display unit 19 is a visual user interface for the user to check the state of the information processing apparatus 100. The display unit 19 is a liquid crystal display (LCD), for example. The storage device 18 is a non-volatile storage medium capable of reading and writing information.

The storage device 18 stores therein an operating system (OS) 10, an application 30, a printer driver 31, and others. The operating system (OS) 10 is a computer program that controls the overall system of the information processing apparatus 100. The application 30 is a computer program that operates on the OS 10 and performs given processing. The application 30 is word-processing software and spreadsheet software, for example. The printer driver (digitizing driver) 31 converts processing target data into data for printing, or data usable by a destination device. The details of the printer driver (digitizing driver) 31 will be described later with reference to FIG. 3.

Figure 3:
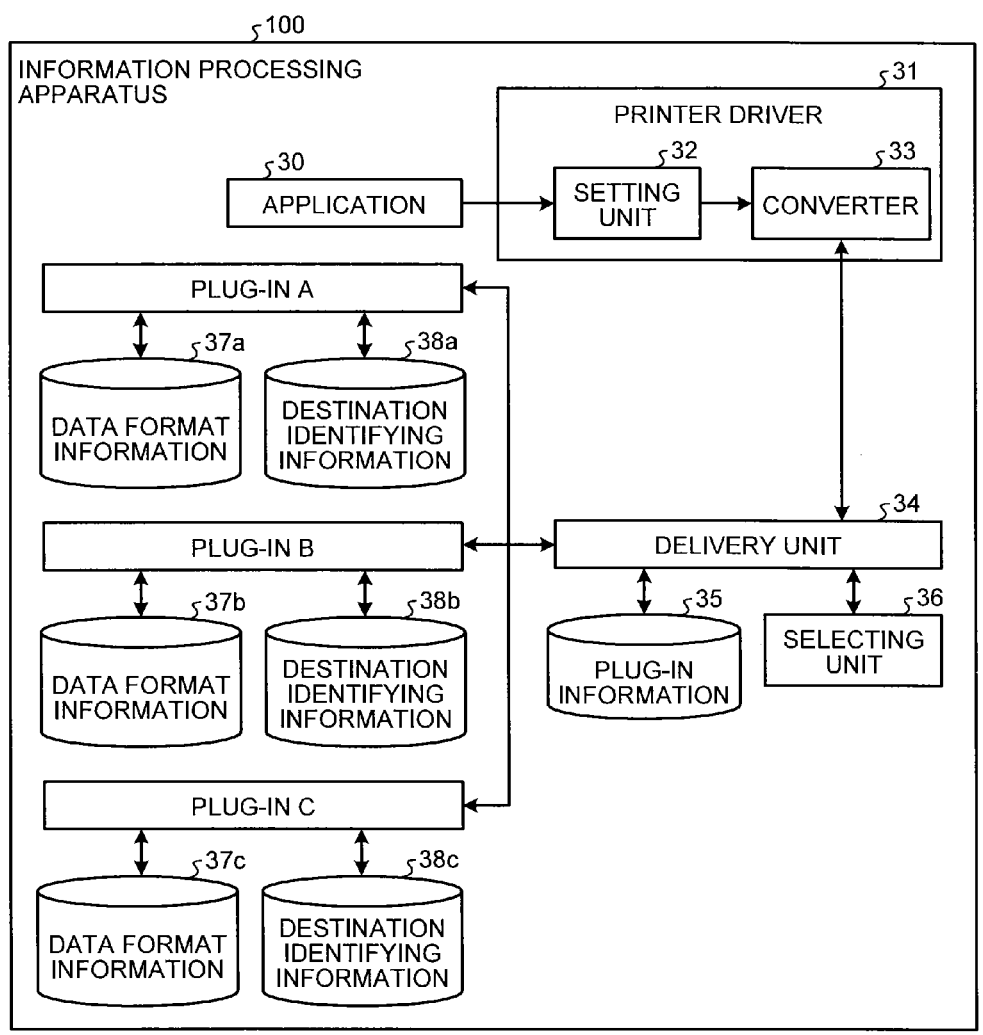
FIG. 3 is a block diagram illustrating an example of the functional blocks of the information processing apparatus in the first embodiment.

Next, the functional blocks of the information processing apparatus 100 in the first embodiment will be described. FIG. 3 is a block diagram illustrating an example of the functional blocks of the information processing apparatus 100 in the first embodiment. The information processing apparatus 100 in the first embodiment includes the application 30, the printer driver 31 (a receiving unit), a delivery unit 34 (a destination-identifying information acquiring unit, a data-format information acquiring unit, and a delivery unit), a selecting unit 36 (a selecting unit), and plug-ins (a plug-in A, a plug-in B, and a plug-in C). The printer driver 31 includes a setting unit 32 and a converter 33. The information processing apparatus 100 further stores plug-in information 35, data format information 37a to 37c, and destination identifying information 38a to 38c in a storage unit not depicted in FIG. 3. In the following description, when the data format information 37a to 37c is not distinguished, the data format information is simply referred to as data format information 37. In the same manner, when the destination identifying information 38a to 38c is not distinguished, the destination identifying information is simply referred to as destination identifying information 38. The delivery unit 34 and the selecting unit 36 in the first embodiment are, as the same as the application 30 and the printer driver 31, implemented as programs. The plug-in A, the plug-in B, and the plug-in C are programs that can be added to or deleted from the delivery unit 34 later.

When a print request is generated in the application 30, the application 30 transmits the print request to the setting unit 32 of the printer driver 31. The print request includes processing target data to be the target of printing (digitization). The print request is generated when printing is selected from a menu of user interface (UI) of the application 30, for example. The setting unit 32, upon receiving the print request, displays a selection (setting) screen for the printer driver 31 on the display unit 19.

Figure 4:
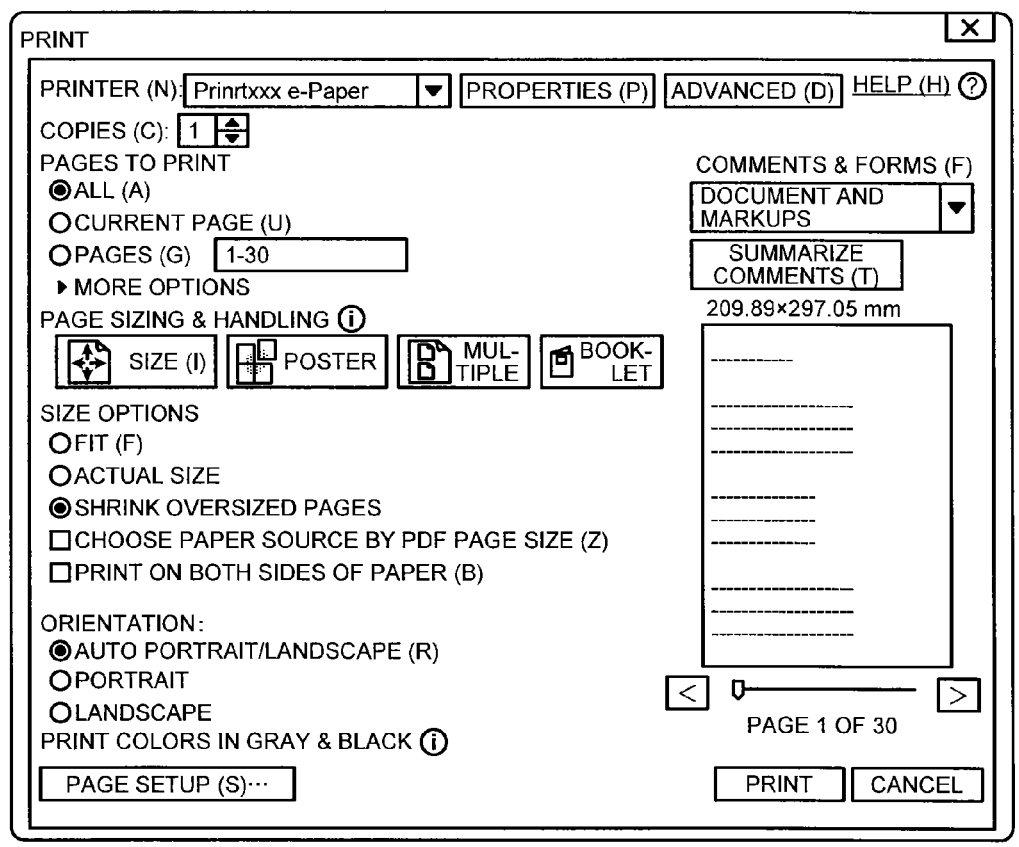
FIG. 4 is a diagram illustrating an example of a selection (setting) screen for a printer driver (digitizing driver) in the first embodiment.

FIG. 4 is a diagram illustrating an example of the selection (setting) screen for the printer driver 31 (digitizing driver) in the first embodiment. The setting unit 32 receives, from the user via the selection (setting) screen, the designation of print setting (digitizing setting) such as the selection of color or monochrome, the orientation of paper, resolution, the number of copies, both-side printing, aggregation, bookbinding, and magnification. The designation of print setting (digitizing setting) is settled by the depression of a print button.

Referring back to FIG. 3, the setting unit 32 transmits the processing target data included in the print request and the print setting designated by the user via the selection (setting) screen to the converter 33. The converter 33, upon receiving the processing target data and the print setting, sends an inquiry to the delivery unit 34 about the data format information 37. The data format information 37 represents one or more formats of data usable in a device of destination. Data can be stored in any format as the data format information 37. In the following description of the first embodiment, the formats of data stored as the data format information 37 are described in image data formats such as a PDF format, an XPS format, a TIFF format, and a JPEG format.

The data format information 37 is stored in a specific storage area of a storage unit not depicted in FIG. 3, and the storage of the information is controlled by a plug-in. Now, a plug-in will be described. The plug-in in the first embodiment is installed on the information processing apparatus 100 for each type of destination device of image data. This is to make it possible, by implementing transmission of image data as a plug-in for each type of device, to add or delete the processing later because a transfer protocol and a usable format of image data are different for each type of destination device. Consequently, even when a new type of device appears, merely adding a plug-in for the device to the information processing apparatus 100 allows image data to be transmitted to the device by the same unified operation as a printing operation. As the data format information 37, in addition to the image data format, the resolution of image data, the minimums and maximums of horizontal and vertical sizes of image data, and others may be stored.

The plug-in further controls the storage of, in addition to the data format information 37, one or more pieces of the destination identifying information 38 that are stored in a specific storage area not depicted in FIG. 3. FIG. 5 is a table illustrating an example of the destination identifying information 38b for the plug-in B in the first embodiment. In an example in FIG. 5, the destination identifying information 38b includes an ID, a name, and an address. The ID is an identifier that uniquely identifies a destination device. The name is the name of the destination device. The address is the information that identifies a place of the destination device. The address is an IP address, for example. An example in FIG. 5 illustrates that the name of the destination device identified by the ID of "000A1" is "A's tablet" and its address is "123.456.789.XXX", for example.

Referring back to FIG. 3, in the information processing apparatus 100 in the first embodiment, the plug-in A, the plug-in B, the plug-in C are installed. The number of plug-ins to install in the information processing apparatus 100 is not limited to three, and it may be any number. In the information processing apparatus 100 in the first embodiment, it is assumed that the plug-in A is a plug-in corresponding to a conference system, the plug-in B is a plug-in corresponding to a smart device, and the plug-in C is a plug-in corresponding to a printer. It is further assumed that the data format information 37a for the plug-in A represents the PDF format, the data format information 37b for the plug-in B represents the PDF format and the JPEG format, and the data format information 37c for the plug-in C represents the EMF format.

Referring back to FIG. 3, the delivery unit 34, upon receiving an inquiry of the data format information 37 from the converter 33, refers to the plug-in information 35 and identifies plug-ins being enabled. FIG. 6 is a table illustrating an example of the plug-in information in the first embodiment. In the example in FIG. 6, the plug-in information includes names and statuses. Each of the names is the name of a plug-in. Each of the statuses represents the plug-in being enabled or disabled. The example in FIG. 6 illustrates that the name of the plug-in A is "conference system" and the status of the plug-in A is "enabled", for example. When the plug-in information is in a state illustrated in FIG. 6, the delivery unit 34 identifies that the enabled plug-ins are the plug-in A and the plug-in B.

Referring back to FIG. 3, the delivery unit 34 then sends inquiries to the enabled plug-ins about the data format information 37. In the example in FIG. 6, because the enabled plug-ins are the plug-in A and the plug-in B, the delivery unit 34 sends an inquiry to the plug-in A about the data format information 37a, and sends an inquiry to the plug-in B about the data format information 37b. As in the foregoing, in the information processing apparatus 100 in the first embodiment, because the data format information 37a for the plug-in A represents the PDF format, the delivery unit 34 receives the information indicative of PDF format from the plug-in A as the data format information 37a. In the same manner, because the data format information 37b for the plug-in B represents the PDF format and the JPEG format, the delivery unit 34 receives the information indicative of PDF format and the information indicative of the JPEG format from the plug-in B as the data format information 37b.

The delivery unit 34 then transmits, to the converter 33 in the printer driver 31, the data format information 37 received from the enabled plug-ins.

The converter 33 then, upon receiving the data format information 37 from the delivery unit 34, converts the processing target data into a format defined in the data format information 37 based on the printing setting. In the example in FIG. 6, because the converter 33 receives the foregoing data format information 37*a* and the data format information 37*b* from the plug-in A and the plug-in B, respectively, the converter 33 converts the processing target data into PDF format and JPEG format. The converter 33 then transmits the converted image data to the delivery unit 34.

The delivery unit 34 then sends inquiries the enabled plug-ins about the destination identifying information 38, and receives the destination identifying information 38 from the enabled plug-ins. In the example in FIG. 6, because the enabled plug-ins are the plug-in A and the plug-in B, the delivery unit 34 sends an inquiry to the plug-in A about the destination identifying information 38*a* and sends an inquiry to the plug-in B about the destination identifying information 38*b*. The delivery unit 34 then receives the destination identifying information 38 from the plug-in A and the plug-in B. The delivery unit 34 transmits the destination identifying information 38 to the selecting unit 36.

Figure 7:
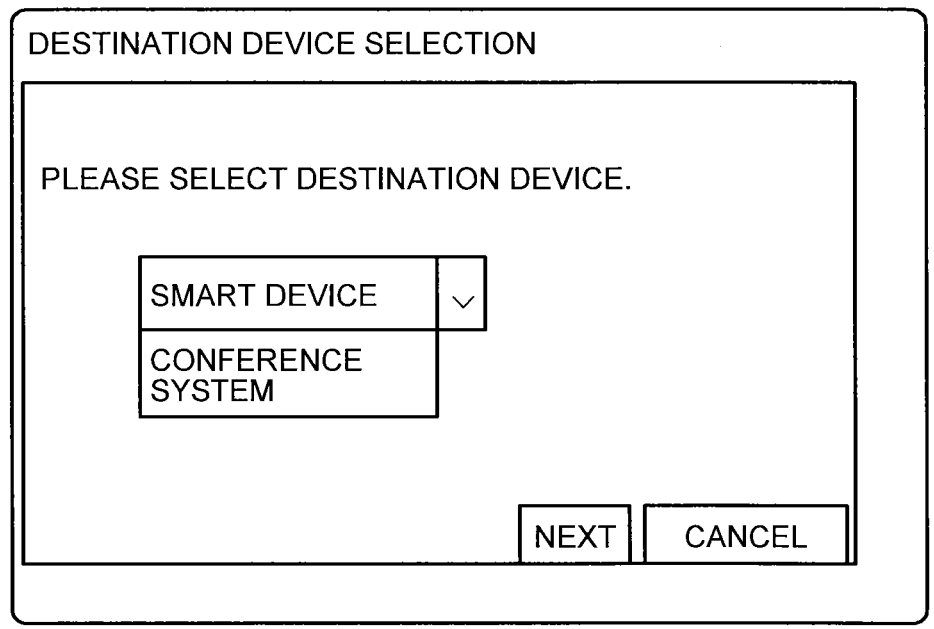
FIG. 7 is a diagram illustrating an example of a selection screen for the type of destination device in the first embodiment.
Figure 8:
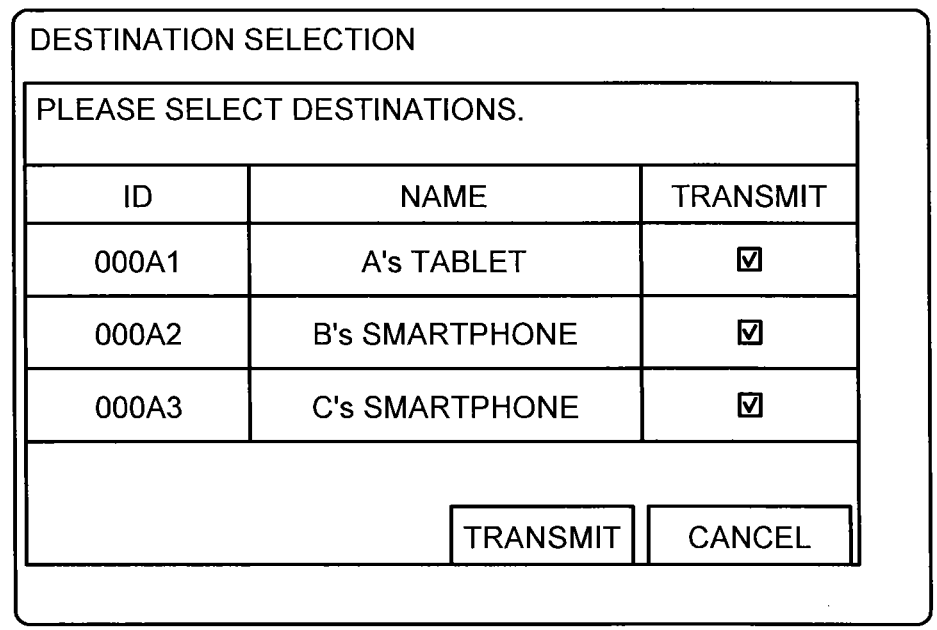
FIG. 8 is a diagram illustrating an example of a selection screen for destination devices in the first embodiment.

The selecting unit 36 then displays, upon receiving the destination identifying information 38 from the delivery unit 34, a screen to select a destination device on the display unit 19. FIG. 7 is a diagram illustrating an example of a selection screen for the type of destination device in the first embodiment. FIG. 8 is a diagram illustrating an example of a selection screen for destination devices in the first embodiment. FIGS. 7 and 8 illustrate an example that first a user is prompted to select the type of destination device on the screen in FIG. 7 and then to display destination devices of the selected type by the screen in FIG. 8. The selecting unit 36 displays the screen in FIG. 7 subsequent to the conversion of the processing target data and the acquisition of the destination identifying information 38 to be displayed as candidates, after the print button in the screen in FIG. 4 is depressed. The example in FIG. 8 illustrates a situation in which the smart device is selected in the selection screen in FIG. 7 as the type of destination device. The selecting unit 36 may display all of the destination devices as the candidates of destination at one time, without displaying destinations in a hierarchical manner as exemplified in the examples of FIGS. 7 and 8.

Referring back to FIG. 3, the delivery unit 34 delivers, by using the plug-ins, the converted image data to the destination device selected by the selecting unit 36.

The plug-in information and the information stored for each of the plug-ins A to C in the foregoing are changed as needed by the user via a management screen for destination devices. FIG. 9 is a diagram illustrating an example of the management screen for destination devices in the first embodiment. The delivery unit 34 displays the management screen for destination devices in FIG. 9, for example, and receives the setting from the user via the management screen. In the example in FIG. 9, for example, by operating a check box of enabled/disabled, the plug-in can be set to being enabled or disabled. Consequently, this can change the type of device displayed in the selection screen for the type of destination device (see FIG. 7).

By the user depressing a setting button in FIG. 9, a screen to change the information stored for each plug-in is displayed, and the setting can be changed via the screen. The information stored for each plug-in is the data format information 37 and the destination identifying information 38 in the foregoing, for example. When the destination identifying information 38 for the device 200 such as the smart device 200*a* having a camera function is added, a code such as a QR code (registered trademark) may be displayed on the setting screen. That is, the smart device 200*a* may be linked to the information processing apparatus 100 as the destination identifying information 38, by acquiring the information to add the destination identifying information 38 by photographing the code with the smart device 200*a* and then transmitting the processing result corresponding to the information to the information processing apparatus 100 from the smart device 200*a*.

Moreover, by the user depressing an add-destination-device button, a plug-in corresponding to a new device (for example, a whiteboard system) can be added. Consequently, the delivery of image data to a new device is enabled, without reinstalling the printer driver 31 or the delivery unit 34.

Figure 10:
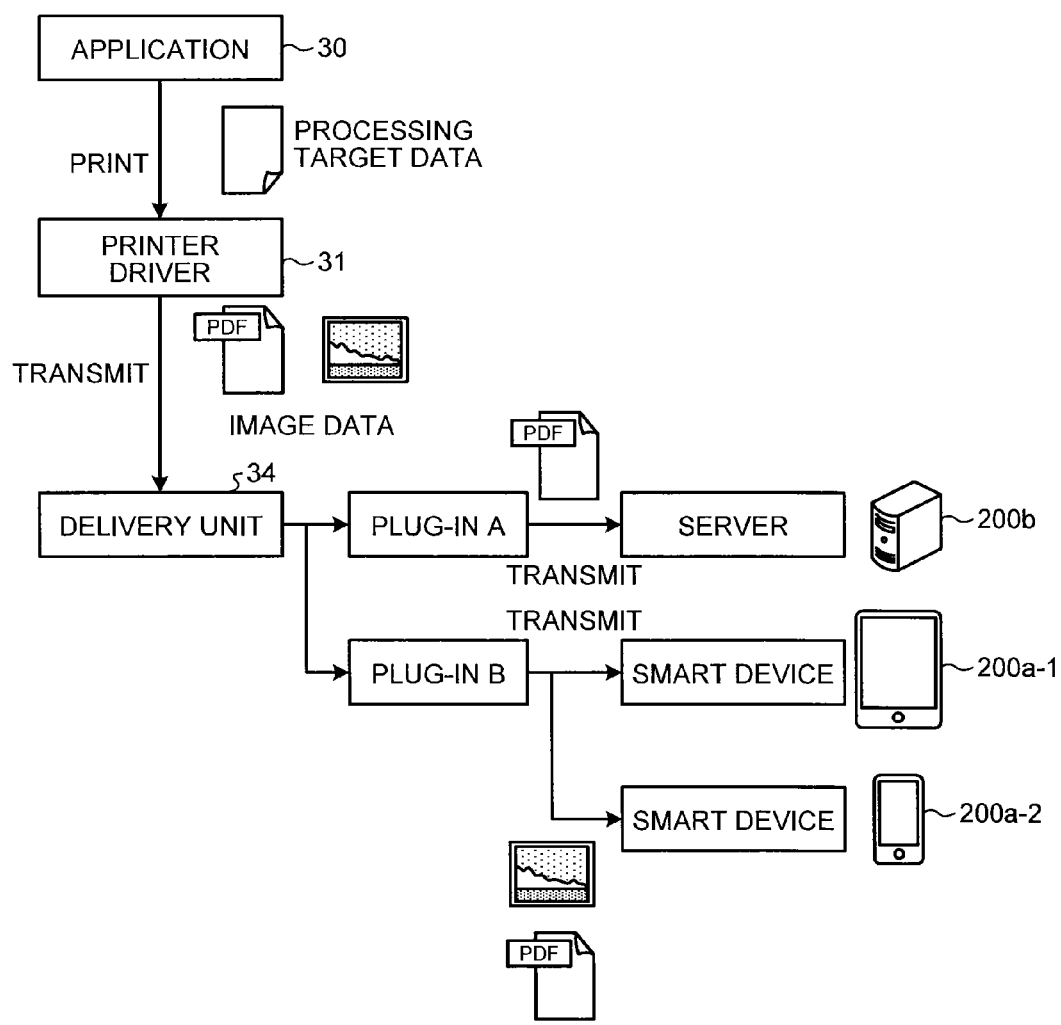
FIG. 10 is a diagram illustrating an outline of data flow performed in an information delivery method in the first embodiment.

Next, an outline of data flow performed in the information delivery method in the first embodiment will be described. FIG. 10 is a diagram illustrating the outline of data flow performed in the information delivery method in the first embodiment. The example in FIG. 10 illustrates a situation in which image data is delivered to a smart device 200*a*-1, a smart device 200*a*-2, and the server 200*b*. First, the application 30 transmits processing target data to the printer driver (digitizing driver) 31. The printer driver 31 then converts the processing target data into the image data in PDF format and JPEG format. The printer driver 31 transmits the image data to the delivery unit 34. The delivery unit 34 delivers the image data in PDF format to the server 200*b* by using the plug-in A. In the same manner, the delivery unit 34 delivers the image data in PDF format and JPEG format to the smart device 200*a*-1 and the smart device 200*a*-2 by using the plug-in B.

The reason for transmitting image data in a plurality of image data formats (PDF format and JPEG format) for the same processing target data is that there may be cases of using a different image data format for each portion of images depending on the application in the smart device 200*a*.

Figure 11:
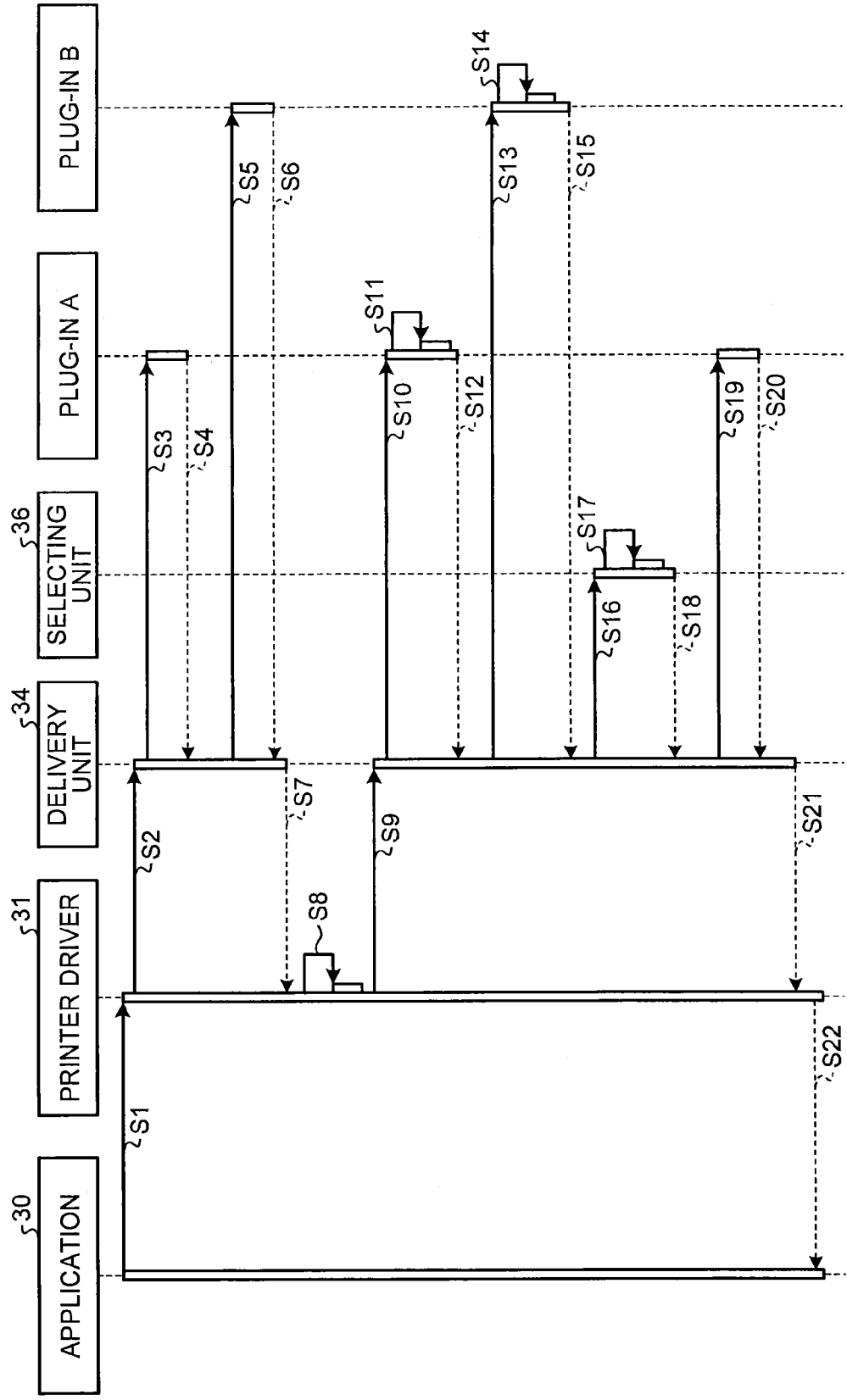
FIG. 11 is a diagram illustrating an example of a sequence performed in the information delivery method in the first embodiment.

Next, a sequence performed in the information delivery method in the first embodiment will be described. FIG. 11 is a diagram illustrating the sequence performed in the information delivery method in the first embodiment. First, when a print request is generated in the application 30, the application 30 transmits the print request including processing target data to the setting unit 32 in the printer driver 31 (Step S1). Next, the printer driver 31 (the converter 33) sends an inquiry to the delivery unit 34 about the data format information 37 (Step S2).

The delivery unit 34 refers to the plug-in information 35 and identifies enabled plug-ins. It is assumed here that the enabled plug-ins are the plug-in A and the plug-in B. The delivery unit 34 then sends an inquiry to the plug-in A about the data format information 37*a* (Step S3). The plug-in A then returns the information indicative of PDF format to the delivery unit 34 as the data format information 37*a* (Step S4). In the same manner, the delivery unit 34 sends an inquiry to the plug-in B about the data format information 37*b* (Step S5). The plug-in B then returns the information indicative of PDF format and JPEG format to the delivery unit 34 as the data format information 37*b* (Step S6).

The delivery unit 34 then returns the PDF format and the JPEG format to the printer driver 31 as the data format information 37 (Step S7). The printer driver 31 (the converter 33) then converts the processing target data included in the print request into the image formats (PDF format and JPEG format) indicated by the data format information 37 received from the delivery unit 34 (Step S8). The printer driver 31 (the converter 33) then transmits the converted image data to the delivery unit 34 (Step S9).

The delivery unit 34 then sends an inquiry to the plug-in A about the destination identifying information 38a (Step S10). The plug-in A reads out the destination identifying information 38a that the plug-in A itself retains (Step S11). The plug-in A then returns the destination identifying information 38a to the delivery unit 34 (Step S12). In the same manner, the delivery unit 34 sends an inquiry to the plug-in B about the destination identifying information 38b (Step S13). The plug-in B reads out the destination identifying information 38b that the plug-in B itself retains (Step S14). The plug-in B then returns the destination identifying information 38b to the delivery unit 34 (Step S15).

The delivery unit 34 then transmits the destination identifying information 38 received at Step S12 and Step S15 to the selecting unit 36 (Step S16). The selecting unit 36 then displays a screen to select destination devices on the display unit 19 based on the destination identifying information 38, and receives an operating input indicating one or more destination devices from the user (Step S17). It is assumed here that the selecting unit 36 received an operating input that selects the server 200b of conference system (a destination device included in the destination identifying information 38a for the plug-in A). The selecting unit 36 then returns, to the delivery unit 34, the destination identifying information 38a of the server 200b as a destination device (Step S18).

The delivery unit 34, by using the plug-in A that stores the destination identifying information 38a of the server 200b as a destination received at Step S18, transmits the image data in PDF format to the destination device (the server 200b) (Step S19). The plug-in A returns, to the delivery unit 34, transmission result information indicating the result of transmission (a success or failure) (Step S20). The delivery unit 34 then returns the transmission result information to the printer driver 31 (Step S21). The printer driver 31 then returns the transmission result information to the application 30 (Step S22).

As in the foregoing, the information delivery system 400 (the information processing apparatus 100) in the first embodiment stores, for each device type, the data format information 37 indicative of one or more image data formats usable, and one or more pieces of destination identifying information, and includes one or more plug-ins that perform communication with the devices. Consequently, the information delivery system 400 (the information processing apparatus 100) in the first embodiment allows the user to transmit the image data to various devices including a printer by the same unified operation as a printing operation without being conscious of image data formats usable.

First Modification of First Embodiment

Next, a first modification of the first embodiment will be described. In the information delivery system 400 (the information processing apparatus 100) according to the first modification, the printer driver 31 performs the conversion on processing target data when the presence of the delivery unit 34 can be checked. The description of the first modification will describe the points that are different from those in the first embodiment, and will omit the descriptions of the same points.

Figure 12:
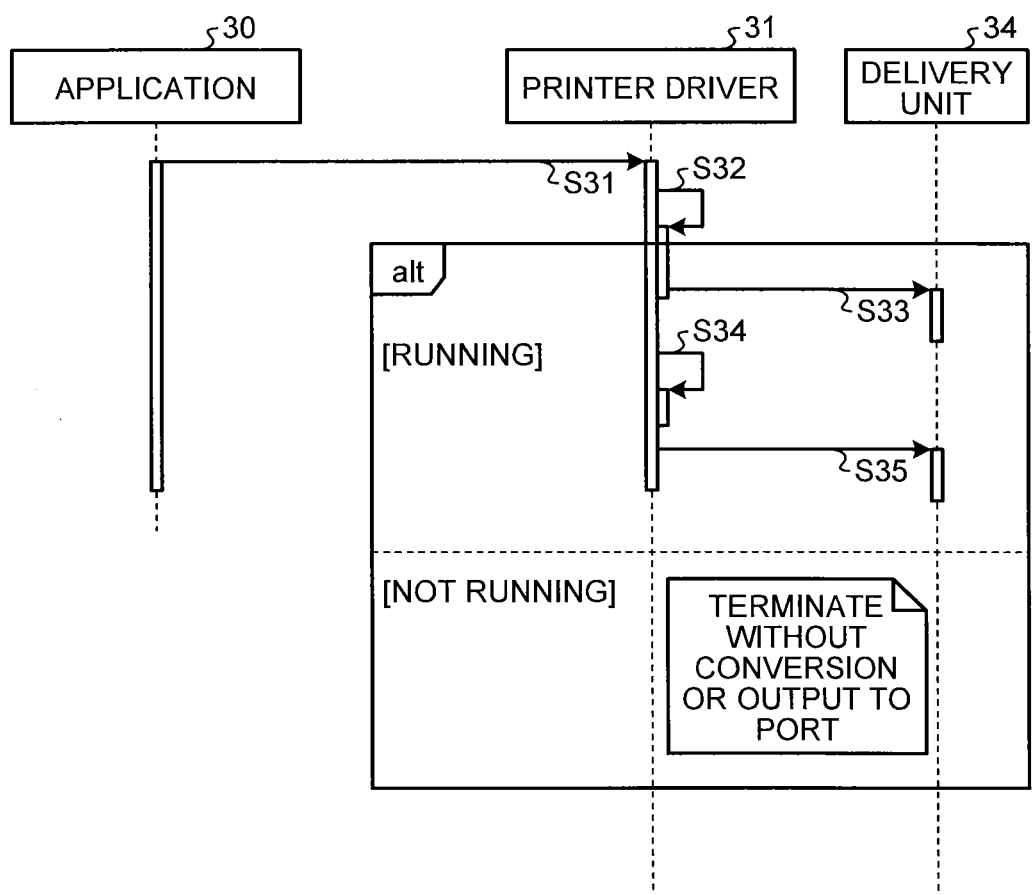
FIG. 12 is a diagram illustrating a sequence performed in an information delivery method according to a first modification of the first embodiment.

FIG. 12 is a diagram illustrating a sequence performed in an information delivery method in the first modification of the first embodiment. First, when a print request is generated in the application 30, the application 30 transmits the print request including processing target data to the setting unit 32 of the printer driver 31 (Step S31). The printer driver 31 (the converter 33) then determines whether the conversion is to be performed on the processing target data (Step S32). Specifically, the printer driver 31 (the converter 33) checks whether the delivery unit 34 is present (whether a program file that implements the delivery unit 34 is present in a given path, and whether the delivery unit 34 is running) (Step S33). If the delivery unit 34 is not present, then the printer driver 31 (the converter 33) does not perform the conversion on the processing target data. If the delivery unit 34 is present, then the printer driver 31 (the converter 33) generates image data, by performing the conversion on the processing target data based on the data format information 37 received from the delivery unit 34 (Step S34). The delivery unit 34 then transmits the image data to the device 200 of a destination selected by the selecting unit 36 (Step S35).

As in the foregoing, in the first modification, the printer driver 31 (the converter 33) does not perform the conversion on the processing target data when the delivery unit 34 is not present. Consequently, the processing of the converter 33 of the printer driver 31 can be prevented from being performed, in a state of the delivery unit 34 not being installed.

Second Modification of First Embodiment

Next, a second modification of the first embodiment will be described. The description of the second modification will describe the points that are different from those in the first embodiment and will omit the descriptions of the same points. In the description of the foregoing first embodiment, explained was the sequence to perform the delivery (selecting a destination and delivery to the destination device), after the conversion (inquiring the data format information 37 and conversion target data) performed by the printer driver 31. This is because the printer driver 31 operates in the process of the application 30 and it is necessary to release the printing process early by performing the conversion ahead. That is, in the explanation of the first embodiment, the conversion and the delivery are in the form of loose coupling. However, the conversion that converts image data to be usable by the device 200 of a destination may be performed after the selection of the device 200 of the destination is performed ahead.

Figure 13:
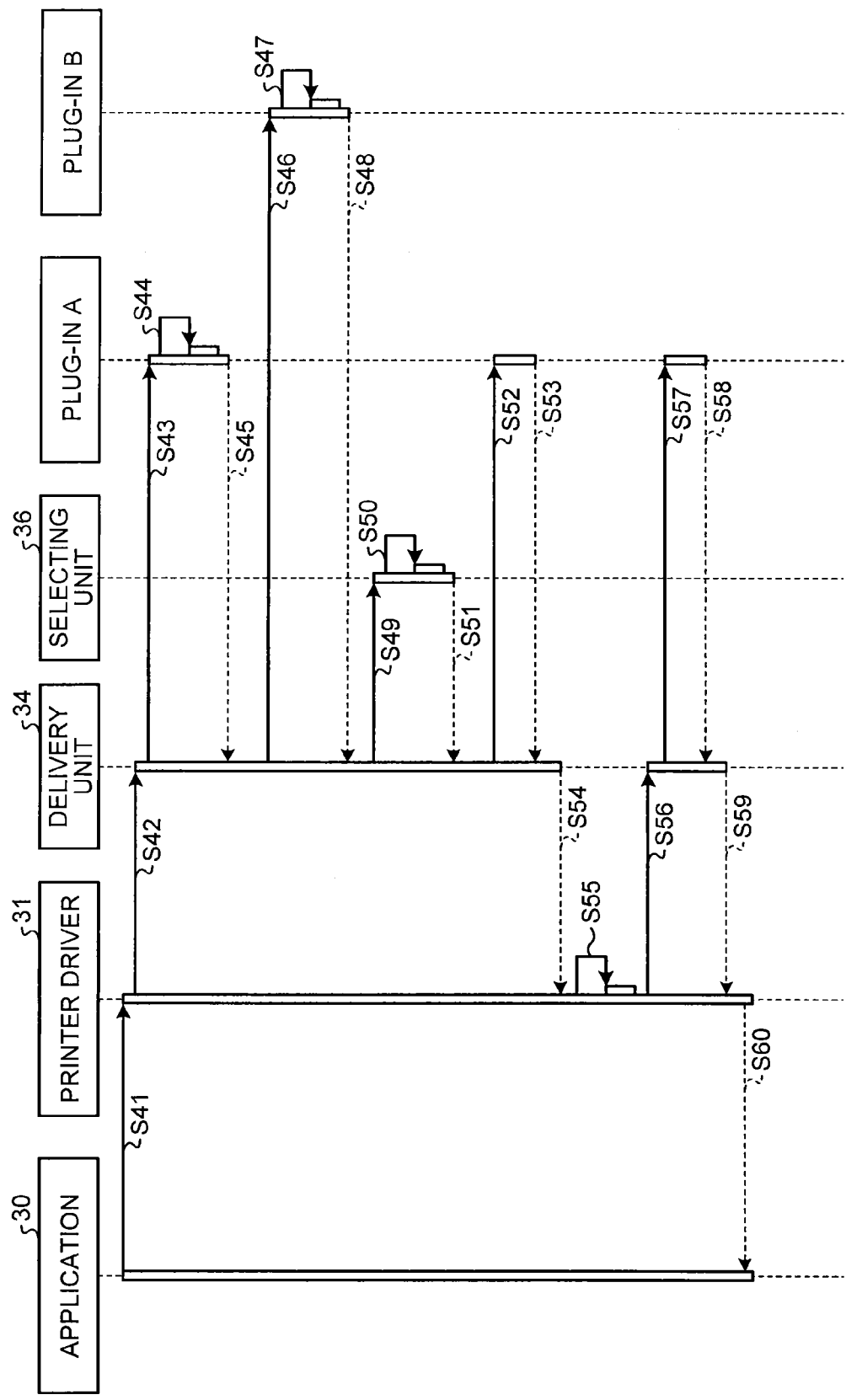
FIG. 13 is a diagram illustrating a sequence performed in an information delivery method according to a second modification of the first embodiment.

FIG. 13 is a diagram illustrating a sequence performed in an information delivery method in the second modification of the first embodiment. First, when a print request is generated in the application 30, the application 30 transmits the print request including processing target data to the setting unit 32 of the printer driver 31 (Step S41). The printer driver 31 (the converter 33) then sends an inquiry to the delivery unit 34 about the data format information 37 (Step S42).

The delivery unit 34 refers to the plug-in information 35 and identifies enabled plug-ins. It is assumed here that the enabled plug-ins are the plug-in A and the plug-in B. The delivery unit 34 then sends an inquiry to the plug-in A about destination identifying information (Step S43). The plug-in A reads out the destination identifying information that the plug-in A itself retains (Step S44). The plug-in A then returns the destination identifying information to the delivery unit 34 (Step S45). In the same manner, the delivery unit 34 sends an inquiry to the plug-in B about destination identifying information (Step S46). The plug-in B reads out the destination identifying information that the plug-in B itself retains (Step S47). The plug-in B then returns the destination identifying information to the delivery unit 34 (Step S48).

The delivery unit 34 then transmits the destination identifying information received at Step S45 and Step S48 to the selecting unit 36 (Step S49). The selecting unit 36 then displays a screen to select destination devices on the display unit 19 based on the destination identifying information, and receives an operating input indicating one or more destination devices from the user (Step S50). It is assumed here that the selecting unit 36 receives an operating input that selects the server 200b of conference system (a destination device included in the destination identifying information for the plug-in A). The selecting unit 36 then returns, to the delivery unit 34, the destination identifying information of the server 200b as a destination (Step S51).

The delivery unit 34 then sends an inquiry to the plug-in A about the data format information 37a (Step S52). The plug-in A then returns the information indicative of PDF format to the delivery unit 34 as the data format information 37a (Step S53). The delivery unit 34 in the second modification here, being different from the delivery unit 34 in the first embodiment, does not send an inquiry to the plug-in B about the data format information 37b.

The delivery unit 34 then returns the PDF format to the printer driver 31 as the data format information 37 (Step S54). The printer driver 31 (the converter 33) then converts the processing target data included in the print request into the image format (PDF format) indicated by the data format information 37 received from the delivery unit 34 (Step S55). The printer driver 31 (the converter 33) then transmits the converted image data to the delivery unit 34 (Step S56).

The delivery unit 34, by using the plug-in A that stores the destination identifying information of the server 200b as a destination received at Step S51, transmits the image data in PDF format to the destination device (the server 200b) (Step S57). The plug-in A returns, to the delivery unit 34, transmission result information indicating the result of transmission (a success or failure) (Step S58). The delivery unit 34 then returns the transmission result information to the printer driver 31 (Step S59). The printer driver 31 then returns the transmission result information to the application 30 (Step S60).

As in the foregoing, in the second modification, the printer driver 31 (the converter 33) converts the processing target data into image data in a format indicated by the data format information 37 in the device 200 selected as the destination. Consequently, the information delivery system 400 (the information processing apparatus 100) in the second modification, as compared with the information delivery system 400 (the information processing apparatus 100) in the first embodiment, can reduce the load in conversion of the printer driver 31 (the converter 33).

Supplement to First Embodiment

In the description of the foregoing first embodiment, the printer driver 31 and the delivery unit 34 (and the selecting unit 36) are exemplified as separate functional blocks. However, the delivery unit 34 (and the selecting unit 36) may be configured as a functional block in the printer driver 31.

The delivery unit 34 (and the selecting unit 36) may be configured to be installed at the same time the printer driver 31 is installed on the information processing apparatus 100, or the delivery unit 34 (and the selecting unit 36) may be configured to be installed on the information processing apparatus 100 independently from the installation of the printer driver 31.

When the delivery unit 34 (and the selecting unit 36) is installed on the information processing apparatus 100 independently from the installation of the printer driver 31, the delivery unit 34 (and the selecting unit 36) can be freely updated and uninstalled.

Meanwhile, including the delivery unit 34 (and the selecting unit 36) in the package of the printer driver 31 has an advantageous effect, also in installing Point & Print (registered trademark), that the delivery unit 34 (and the selecting unit 36) can be installed in the same way as being stand-alone.

Now, Point & Print (registered trademark) will be described. Point & Print (registered trademark) is a system in which a printer, a host computer, and a client computer are connected to a network, and the client computer performs print to the network printer by using the host computer as a print server. In such a system, it is necessary for the client computer to install the same printer driver as that of the host computer. The cost of installing the printer driver on individual client computers on the network is extremely high. As a means for solving this problem, Point & Print (registered trademark) has a mechanism that downloads and installs the printer driver to a client computer from the host computer. The printer driver installed by Point & Print (registered trademark) can change whether drawing is to be performed on the client PC side or on the host PC side. Performing the drawing on the client PC side is referred to as "client side rendering." Performing the drawing on the host PC side is referred to as "server side rendering." For the printer driver installed by Point & Print (registered trademark), a RAW spool format and an EMF spool format are available.

The delivery unit 34 (and the selecting unit 36) may be made to operate as one of the applications in the information processing apparatus 100, or may be made to operate as one of the services of the OS in the information processing apparatus 100. Furthermore, the delivery unit 34 (and the selecting unit 36) may be made to operate in an external device that is capable of communicating with the information processing apparatus 100.

The plug-in of the delivery unit 34 may be kept installed on the same path as that of the program file that implements the delivery unit 34. Furthermore, in the description of the first embodiment, explained is the method in which the devices 200 that are the candidates of destination, to which the delivery unit 34 transmits image data, are statically registered for each plug-in as the destination identifying information in advance. However, the delivery unit 34 may be configured to search for the devices 200 to be the candidates of destination by dynamically performing the search (discovery) on the network.

The program executed in the information processing apparatus 100 is provided, as a computer program product, in a file of an installable format or an executable format stored in a computer readable storage medium such as a CD-ROM, a memory card, a CD-R, and a digital versatile disk (DVD).

The program executed in the information processing apparatus 100 may be configured to be stored on a computer connected to a network such as the Internet and provided by downloading via the network. The program executed in the information processing apparatus 100 may be configured to be provided, without downloading, via a network such as the Internet.

The program in the information processing apparatus 100 may be configured to be provided by embedding in the ROM 12 or the like in advance.

The program executed in the information processing apparatus 100 is modularly configured including the foregoing various functional blocks (the setting unit 32, the converter 33, the delivery unit 34, the plug-ins, and the selecting unit 36). As for the various functional blocks, as the actual hardware, the CPU 11 reads out and executes the program from a storage medium such as the storage device 18, and whereby the various functional blocks are loaded on the RAM 13. That is, the above-described various functional blocks are generated on the RAM 13.

A part of the foregoing various functional blocks of the information processing apparatus 100 may be implemented by hardware such as an integrated circuit (IC), without being implemented by software.

Second Embodiment

Figure 14:
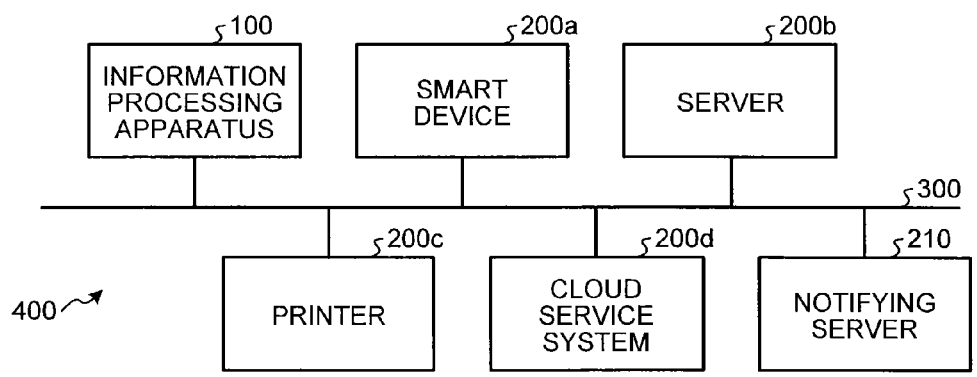
FIG. 14 is a block diagram illustrating an example of the configuration of an information delivery system according to a second embodiment.

Next, a second embodiment will be described. FIG. 14 is a block diagram illustrating an example of the configuration of an information delivery system 400 in the second embodiment. The information delivery system 400 in the second embodiment further includes, in addition to the configuration of the information delivery system 400 in the first embodiment, a notifying server 210 (a notifying unit). The information processing apparatus 100, the smart device 200*a*, the server 200*b*, the printer 200*c*, and the cloud service system 200*d* are the same as those in the first embodiment, and thus their explanations are omitted.

The notifying server 210, when the information processing apparatus 100 becomes possible to deliver data, notifies the destination device of the data that the delivery of data is ready. The information processing apparatus 100, upon receiving a data acquisition request from a device 200, transmits the data corresponding to the data acquisition request to the device 200.

Figure 15:
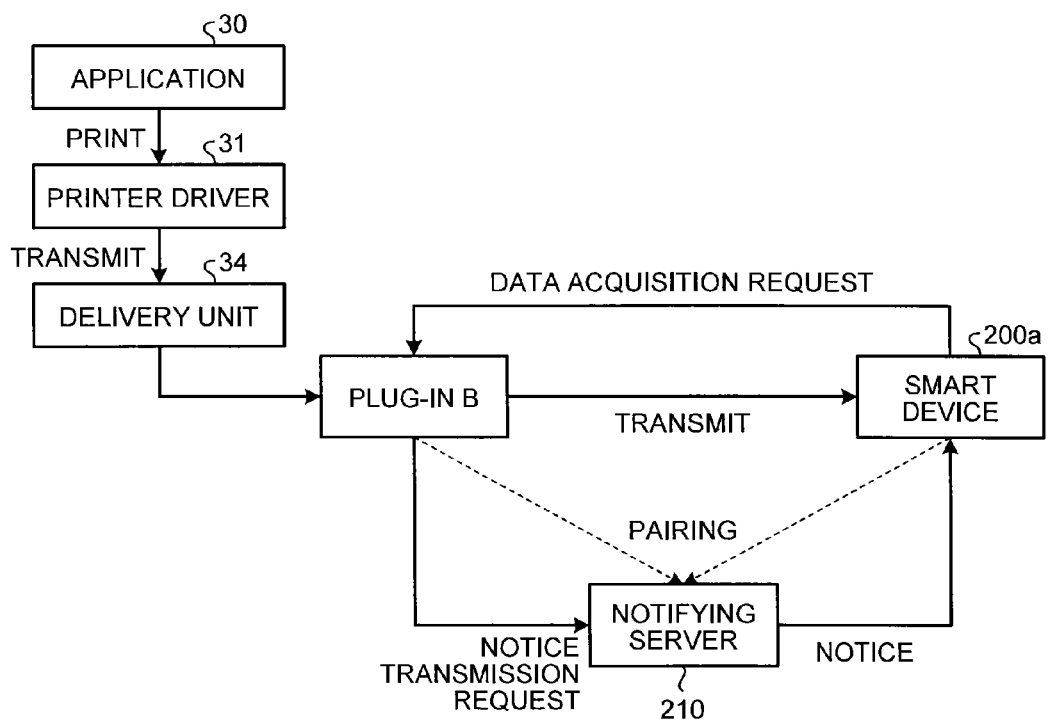
FIG. 15 is a diagram illustrating an outline of an information delivery method performed in the second embodiment.

FIG. 15 is a diagram illustrating an outline of an information delivery method performed in the second embodiment. FIG. 15 illustrates an example of a situation in which the delivery unit 34 transmits data to the smart device 200*a* by using the plug-in B.

First, the pairing (device registration) of the smart device 200*a* to the notifying server 210 is performed and the pairing (device registration) of the plug-in B corresponding to the smart device 200*a* to the notifying server 210 is performed, and whereby notice registration information is generated in the notifying server 210.

Figures 16, 17:
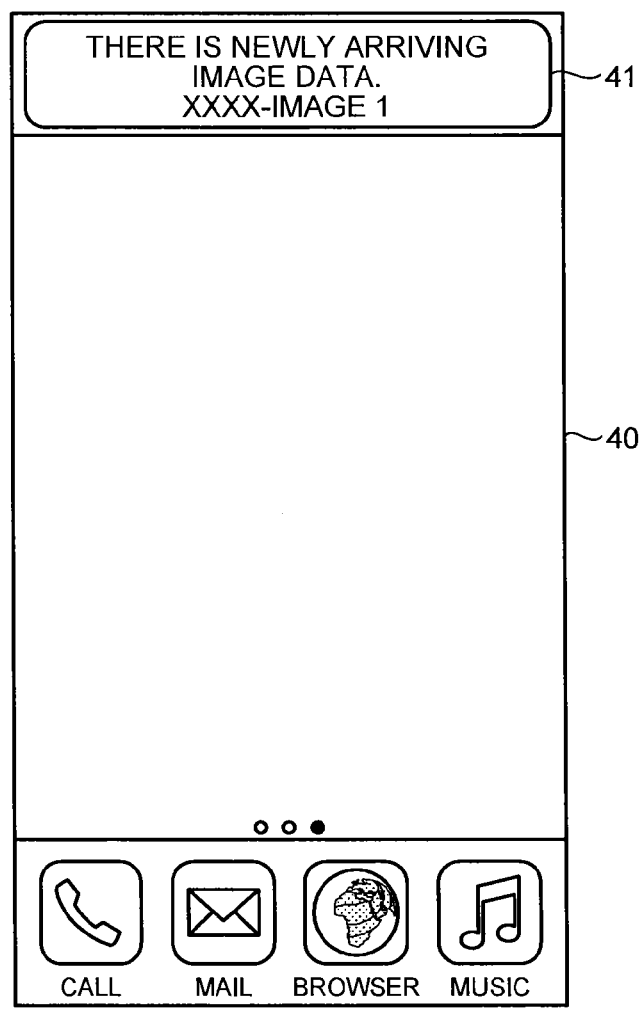
FIG. 16 is a table illustrating an example of notice registration information in the second embodiment.
FIG. 17 is a diagram illustrating an example of a display of a notice in the second embodiment.

FIG. 16 is a table illustrating an example of the notice registration information in the second embodiment. The notice registration information includes a notice source address, a notice source plug-in, and a notice destination address. The notice source address is the address of the information processing apparatus 100 that transmits to the notifying server 210 a transmission request for a notice indicating that the delivery of data is ready. The notice source plug-in is the plug-in that transmits to the notifying server 210 the transmission request for a notice indicating that the delivery of data is ready. The notice destination address is an address indicating the destination of a notice indicating that the delivery of data is ready.

Any specific method for the foregoing pairing (device registration) to generate the notice registration information can be used. For example, the display controller 17 of the information processing apparatus 100 displays a setting screen to set the notice destination address of the plug-in B in the display unit 19, and the input device 16 receives an operating input indicating the notice destination address and the name of the device 200 of notice destination. The delivery unit 34 (plug-in B) then transmits to the notifying server 210 the notice source address (the address of the information processing apparatus 100), the notice source plug-in (the plug-in B), and the notice destination address (the address of the smart device 200*a* input from the input device 16), and whereby the pairing (device registration) is performed. At this time, the plug-in B adds, to the destination identifying information 38*b*, a record having the address and the name of the smart device 200*a* input from the input device 16.

Referring back to FIG. 15, when a print request is subsequently generated in the application 30, the application 30 transmits processing target data to the printer driver (digitizing driver) 31. The printer driver 31 then converts the processing target data into image data in PDF format and JPEG format. The printer driver 31 then transmits the image data in PDF format and JPEG format to the delivery unit 34. The delivery unit 34 then transmits to the notifying server 210 a notice transmission request for a notice indicating that the delivery of data is ready, by using the plug-in B. The notice transmission request includes the information identifying the request source plug-in and the name of delivery target data.

The notifying server 210, upon receiving a notice transmission request from the delivery unit 34 (plug-in B), identifies a notice source address and a notice source plug-in in the notice registration information (see FIG. 16) from the notice transmission request. The notifying server 210 then acquires a notice destination address indicating the address of the smart device 200*a* from a record having the identified notice source address and the notice source plug-in. The notifying server 210 further identifies a name of the delivery target data from the notice transmission request. The notifying server 210 then transmits to the smart device 200*a* a notice indicating that the delivery of data is ready.

FIG. 17 is a diagram illustrating an example of the display of a notice in the second embodiment. The example in FIG. 17 illustrates a situation in which a message 41 indicating that there is newly arriving image data (XXXX-image 1) is displayed on a standby screen of a display unit 40 of the smart device 200*a*. The display unit 40, upon receiving the selection of the message 41 from the user of the smart device 200*a*, displays a screen to confirm whether to acquire newly arriving image data. The smart device 200*a*, when acquiring the newly arriving image data, transmits a data acquisition request for the newly arriving image data to the delivery unit 34 (plug-in B).

Referring back to FIG. 15, the delivery unit 34 (the plug-in B) then transmits, upon receiving the data acquisition request from the smart device 200*a*, the image data in PDF format and JPEG format to the smart device 200*a* by using the plug-in B.

Figure 18:
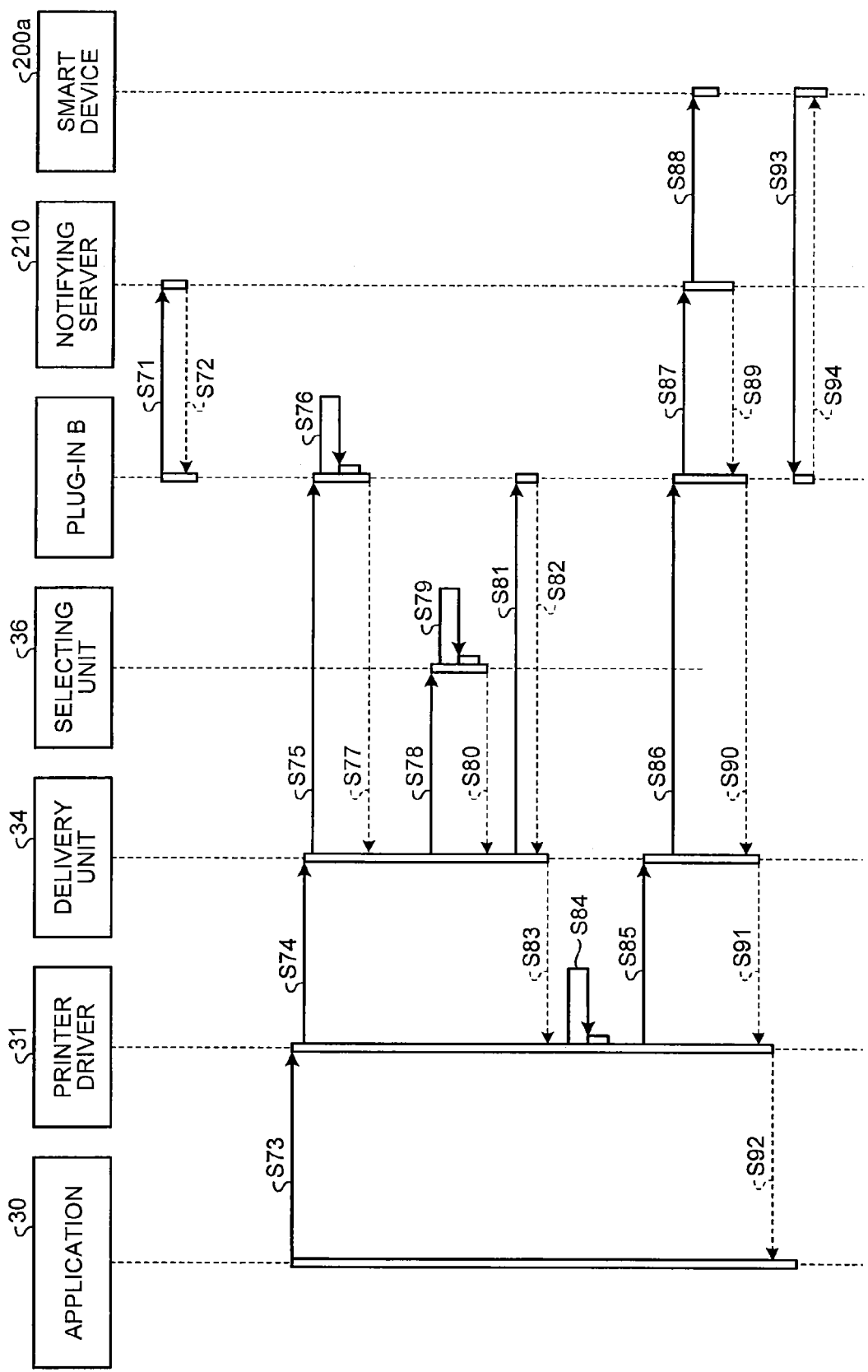
FIG. 18 is a diagram illustrating an example of a sequence performed in an information delivery method in the second embodiment.

Next, a sequence performed in the information delivery method in the second embodiment will be described. FIG. 18 is a diagram illustrating a sequence performed in the information delivery method in the second embodiment. The example in FIG. 18 illustrates a situation in which the delivery unit 34 transmits data to the smart device 200*a* by using the plug-in B.

First, the plug-in B in the information processing apparatus 100 performs the pairing (device registration) of the plug-in B and the smart device 200*a* to the notifying server 210 (Step S71). Specifically, the display controller 17 of the information processing apparatus 100 displays a setting screen to set the notice destination address of the plug-in B in the display unit 19, and the input device 16 receives an operating input indicating the notice destination address and the name of the device 200 of notice destination. The delivery unit 34 (plug-in B) then transmits to the notifying server 210 the notice source address (the address of the information processing apparatus 100), the notice source plug-in (the plug-in B), and the notice destination address (the address of the smart device 200a input from the input device 16), and whereby the pairing (device registration) is performed. At this time, the plug-in B adds, to the destination identifying information 38b, a record having the address and the name of the smart device 200a input from the input device 16.

The notifying server 210 then transmits to the plug-in B a notice indicating that the pairing (device registration) has been completed (Step S72).

When a print request is subsequently generated in the application 30, the application 30 transmits the print request including processing target data to the setting unit 32 of the printer driver 31 (Step S73). The printer driver 31 (the converter 33) then sends an inquiry to the delivery unit 34 about the data format information 37 (Step S74).

The delivery unit 34 refers to the plug-in information 35 and identifies enabled plug-ins. It is assumed that an enabled plug-in is the plug-in B. The delivery unit 34 then sends an inquiry to the plug-in B about the destination identifying information 38b (Step S75). The plug-in B reads out the destination identifying information 38b that the plug-in B itself retains (Step S76). The plug-in B then returns the destination identifying information 38b to the delivery unit 34 (Step S77).

The delivery unit 34 then transmits the destination identifying information 38b received at Step S77 to the selecting unit 36 (Step S78). The selecting unit 36 then displays a screen to select destination devices on the display unit 19 based on the destination identifying information 38b, and receives an operating input indicating one or more destination devices from the user (Step S79). It is assumed here that the selecting unit 36 received an operating input that selects the smart device 200a (the destination device included in the destination identifying information 38b for the plug-in B). The selecting unit 36 then returns, to the delivery unit 34, the destination identifying information of the smart device 200a as a destination (Step S80).

The delivery unit 34 then sends an inquiry to the plug-in B about the data format information 37b (Step S81). The plug-in B then returns information indicative of PDF format and JPEG format to the delivery unit 34 as the data format information 37b (Step S82).

The delivery unit 34 then returns the PDF format and the JPEG format to the printer driver 31 as the data format information 37b (Step S83). The printer driver 31 (the converter 33) then converts the processing target data included in the print request into the image formats (PDF format and JPEG format) indicated by the data format information 37b received from the delivery unit 34 (Step S84). The printer driver 31 (the converter 33) then transmits the converted image data to the delivery unit 34 (Step S85).

The delivery unit 34 then notifies the plug-in B, which stores the device identifying information of the smart device 200a received at Step S80, that the delivery of the image data in PDF format and JPEG format to the destination device (the server 200b) is ready (Step S86). The plug-in B then transmits to the notifying server 210 a notice transmission request for a notice indicating that the delivery of the image data in PDF format and JPEG format is ready (Step S87).

The notifying server 210 then, based on the notice transmission request received at Step S87, transmits to the smart device 200a a notice indicating that the delivery of the image data in PDF format and JPEG format is ready (Step S88).

Specifically, the notifying server 210 identifies, from the notice transmission request, a notice source address and a notice source plug-in in the notice registration information (see FIG. 16) and the name of delivery target image data. The notifying server 210 then acquires a notice destination address indicating the address of the smart device 200a from a record having the identified notice source address and the notice source plug-in, and transmits to the smart device 200a a notice indicating that the delivery of the image data is ready.

The notifying server 210 then returns, to the plug-in B, notice completion information indicating that the notice to the smart device 200a has been completed (Step S89). The plug-in B then returns the notice completion information to the delivery unit 34 (Step S90). The delivery unit 34 then returns the notice completion information to the printer driver 31 (Step S91). The printer driver 31 then returns the notice completion information to the application 30 (Step S92).

Then, the smart device 200a transmits a data acquisition request to the plug-in B (Step S93). The plug-in B then transmits, upon receiving the data acquisition request from the smart device 200a, the image data in PDF format and JPEG format to the smart device 200a (Step S94).

As in the foregoing, in the second embodiment, the smart device 200a can receive a notice from the notifying server 210 (the notifying unit) when the delivery of data is ready in the information processing apparatus 100.

Third Embodiment

Figure 19:
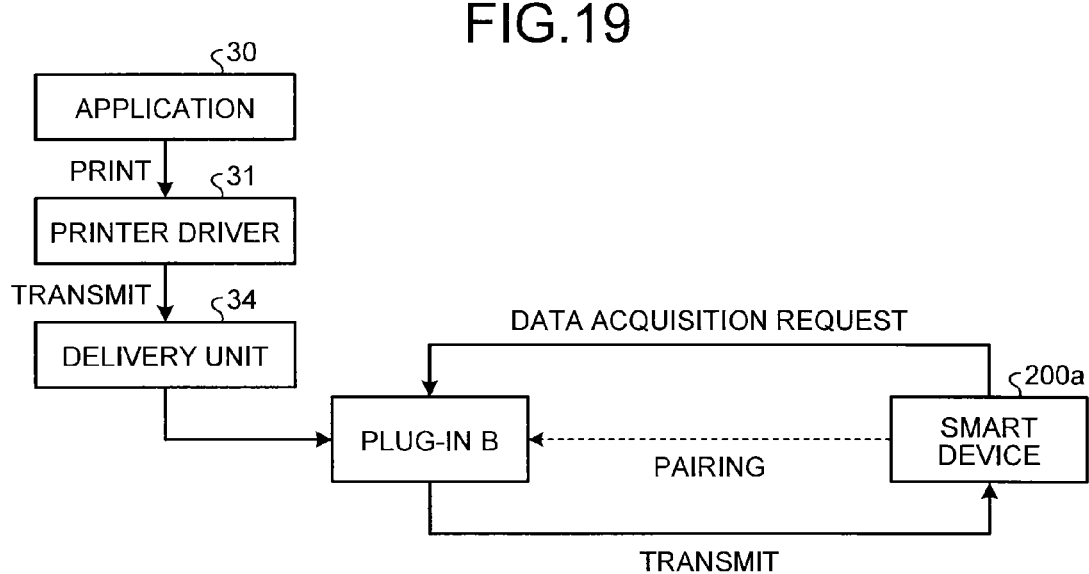
FIG. 19 is a diagram illustrating an outline of an information delivery method performed according to a third embodiment.

Next, a third embodiment will be described. FIG. 19 is a diagram illustrating an outline of an information delivery method performed in the third embodiment. The example in FIG. 19 illustrates a situation in which the pairing (device registration) of the smart device 200a to the plug-in B is performed.

First, the plug-in B receives a device registration request from the smart device 200a, and whereby the pairing (device registration) of the plug-in B and the smart device 200a is performed. Specifically, when the information processing apparatus 100 receives a device registration request including a name indicating the device type (smart device) and the address of the smart device 200a, the plug-in B that corresponds to the smart device 200a adds a record corresponding to the device registration request to the destination identifying information 38b. Consequently, the pairing (device registration) of the smart device 200a to the plug-in B is performed.

Subsequently, when a print request is generated in the application 30, the application 30 transmits processing target data to the printer driver (digitizing driver) 31. The printer driver 31 then converts the processing target data into image data in PDF format and JPEG format. The printer driver 31 then transmits the image data in PDF format and JPEG format to the delivery unit 34.

The delivery unit 34 (the plug-in B) then transmits, upon receiving a data acquisition request from the smart device 200a, the image data in PDF format and JPEG format to the smart device 200a by using the plug-in B.

Figure 20:
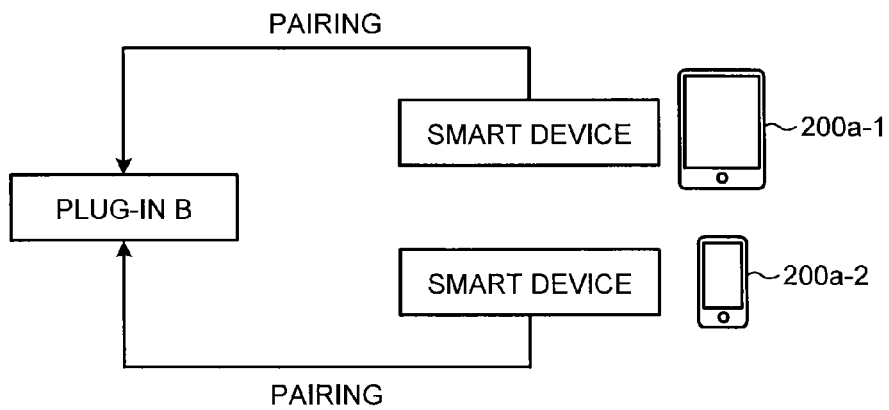
FIG. 20 is a diagram illustrating an example of pairing (device registration) performed in the third embodiment.

FIG. 20 is a diagram illustrating an example of the pairing (device registration) performed in the third embodiment. The example in FIG. 20 illustrates a situation in which the pairing (device registration) of a smart device 200a-1 and a smart device 200a-2 to the plug-in B is performed.

The plug-in B receives a device registration request from the smart device 200a-1, and whereby the pairing (device registration) of the plug-in B and the smart device 200a-1 is performed. Specifically, when the information processing apparatus 100 receives a device registration request including a name indicating the device type (smart device) and the address of the smart device 200a-1, the plug-in B that corresponds to the smart device 200a-1 adds a record corresponding to the device registration request to the destination identifying information 38b.

At this time, the record to be added to the destination identifying information 38b is a record of the ID being "000A1", the name being "A's tablet", and the address being "123.456.789.XXX", for example. Consequently, the pairing (device registration) of the smart device 200a-1 to the plug-in B is performed. Note that the ID is assigned by the plug-in B.

In the same manner, the plug-in B receives a device registration request from the smart device 200a-2, and whereby the pairing (device registration) of the plug-in B and the smart device 200a-2 is performed. Specifically, when the information processing apparatus 100 receives a device registration request including a name indicating the device type (smart device) and the address of the smart device 200a-2, the plug-in B that corresponds to the smart device 200a-2 adds a record corresponding to the device registration request to the destination identifying information 38b.

At this time, the record to be added to the destination identifying information 38b is a record of the ID being "000A2", the name being "B's smartphone", and the address being "123.456.789.YYY". Consequently, the pairing (device registration) of the smart device 200a-2 to the plug-in B is performed.

Figure 21:
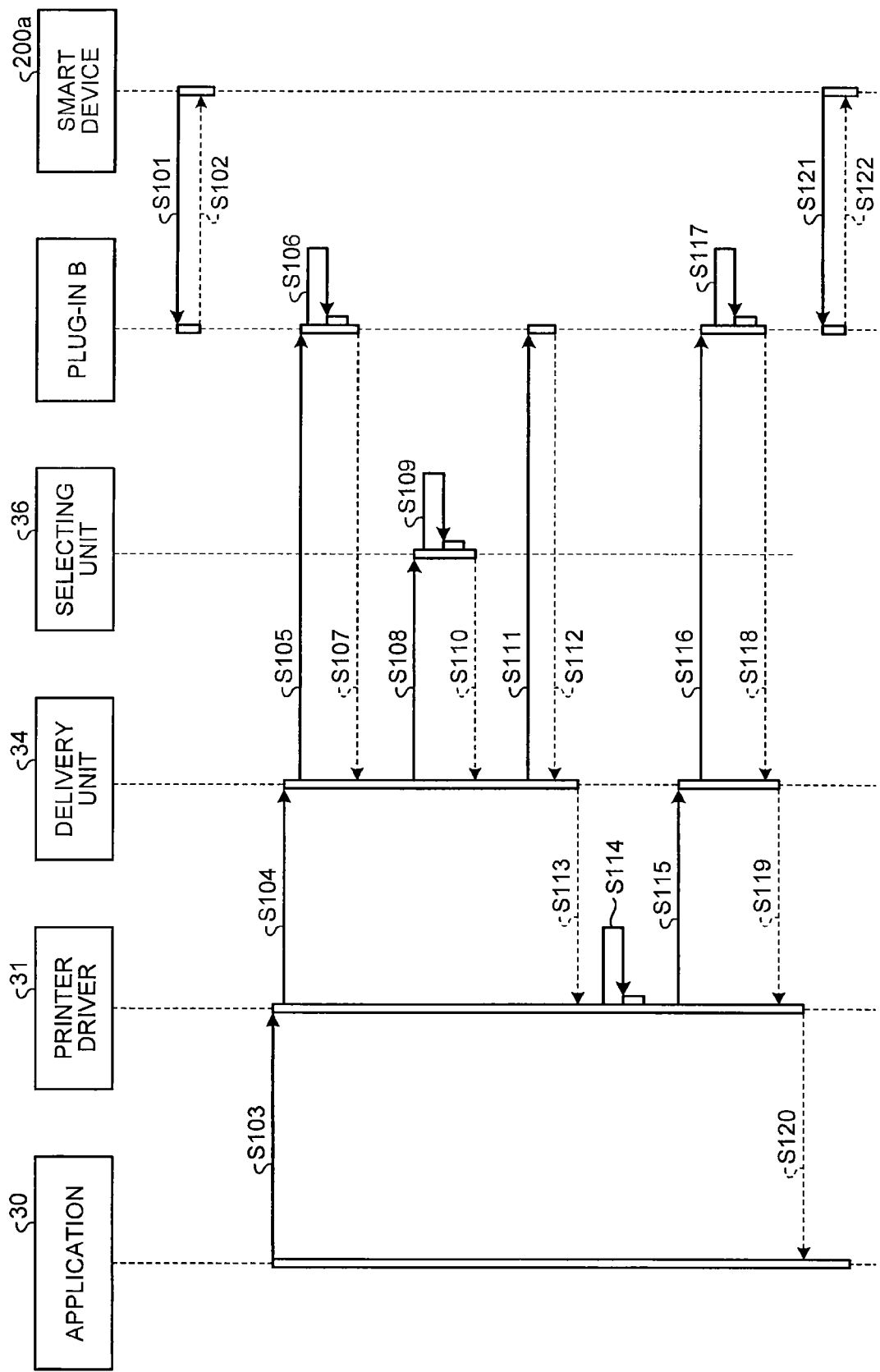
FIG. 21 is a diagram illustrating an example of a sequence performed in the information delivery method in the third embodiment.

Next, a sequence performed in the information delivery method in the third embodiment will be described. FIG. 21 is a diagram illustrating the sequence performed in the information delivery method in the third embodiment. The example in FIG. 21 illustrates a situation in which the delivery unit 34 transmits data to the smart device 200a by using the plug-in B.

First, the plug-in B receives a device registration request from the smart device 200a, and whereby the pairing (device registration) of the plug-in B and the smart device 200a is performed (Step S101). Specifically, when the information processing apparatus 100 receives a device registration request including a name indicating the device type (smart device) and the address of the smart device 200a, the plug-in B that corresponds to the smart device 200a adds a record corresponding to the device registration request to the destination identifying information 38b. Consequently, the pairing (device registration) of the smart device 200a to the plug-in B is performed.

The plug-in B then transmits to the smart device 200a a notice indicating that the pairing (device registration) has been completed (Step S102).

Subsequently, when a print request is generated in the application 30, the application 30 transmits the print request including processing target data to the setting unit 32 of the printer driver 31 (Step S103). The printer driver 31 (the converter 33) then sends an inquiry to the delivery unit 34 about the data format information 37 (Step S104).

The delivery unit 34 refers to the plug-in information 35 and identifies enabled plug-ins. It is assumed that an enabled plug-in is the plug-in B. The delivery unit 34 then sends an inquiry to the plug-in B about the destination identifying information 38b (Step S105). The plug-in B then reads out the destination identifying information 38b that the plug-in B itself retains (Step S106). The plug-in B then returns the destination identifying information 38b to the delivery unit 34 (Step S107).

The delivery unit 34 then transmits the destination identifying information 38b received at Step S107 to the selecting unit 36 (Step S108). The selecting unit 36 then displays a screen to select destination devices on the display unit 19 based on the destination identifying information 38b, and receives an operating input indicating one or more destination devices from the user (Step S109). It is assumed here that the selecting unit 36 received an operating input that selects the smart device 200a (the destination device included in the destination identifying information 38b for the plug-in B). The selecting unit 36 then returns, to the delivery unit 34, the destination identifying information of the smart device 200a as a destination (Step S110).

The delivery unit 34 then sends an inquiry to the plug-in B about the data format information 37b (Step S111). The plug-in B then returns the information indicative of PDF format and JPEG format to the delivery unit 34 as the data format information 37b (Step S112).

The delivery unit 34 then returns the PDF format and the JPEG format to the printer driver 31 as the data format information 37b (Step S113). The printer driver 31 (the converter 33) then converts the processing target data included in the print request into the image formats (PDF format and JPEG format) indicated by the data format information 37b received from the delivery unit 34 (Step S114). The printer driver 31 (the converter 33) then transmits the converted image data to the delivery unit 34 (Step S115).

The delivery unit 34 then notifies the plug-in B, which stores the device specifying information of the smart device 200a received at Step S110, that the delivery of the image data in PDF format and JPEG format to the destination device (the server 200b) is ready (Step S116). The plug-in B then stands by until it receives a data acquisition request from the smart device 200a (Step S117).

The plug-in B then returns status information indicating a stand-by state to the delivery unit 34 (Step S118). The delivery unit 34 then returns the status information indicating a stand-by state to the printer driver 31 (Step S119). The printer driver 31 then returns the status information indicating a stand-by state to the application 30 (Step S120).

Then, the smart device 200a transmits a data acquisition request to the plug-in B (Step S121). The plug-in B then, upon receiving the data acquisition request from the smart device 200a, transmits the image data in PDF format and JPEG format to the smart device 200a (Step S122).

As in the foregoing, in the third embodiment, each of a plurality of plug-ins controls the storage of the destination identifying information 38, by receiving a device registration request including the destination identifying information on a device from the device of the device type corresponding to the plug-in. That is, to each of the plug-ins, the pairing (device registration) of the device 200 the type of which corresponds to the plug-in is performed. Consequently, in accordance with the information processing apparatus 100 in the third embodiment, in response to requests from one or more of the devices 200 identified by one or more pieces of destination identifying information selected by the selecting unit 36, one or more pieces of data can be delivered to the one or more of the devices 200.

Any communication method between the information processing apparatus 100 and the device 200 can be used. The communication method between the information processing apparatus 100 and the device 200 is wireless communication, for example.

Fourth Embodiment

Figure 22:
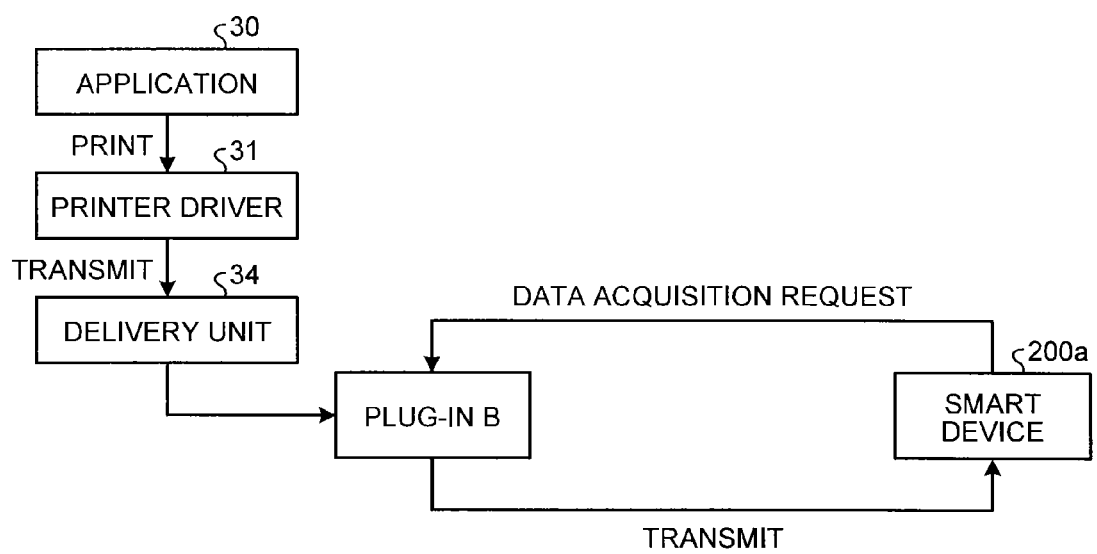
FIG. 22 is a diagram illustrating an outline of an information delivery method performed according to a fourth embodiment.

Next, a fourth embodiment will be described. FIG. 22 is a diagram illustrating an outline of an information delivery method performed in the fourth embodiment. The example in FIG. 22 illustrates a situation in which the pairing (device registration) of the smart device 200a to the plug-in B is not performed.

First, when a print request is generated in the application 30, the application 30 transmits processing target data to the printer driver (digitizing driver) 31. The printer driver 31 then converts the processing target data into image data in PDF format and JPEG format. The printer driver 31 then transmits the image data in PDF format and JPEG format to the delivery unit 34.

The delivery unit 34 (the plug-in B) then transmits, upon receiving a data acquisition request from the smart device 200a, the image data in PDF format and JPEG format to the smart device 200a by using the plug-in B.

Next, a sequence performed in the information delivery method in the fourth embodiment will be described. FIG. 23 is a diagram illustrating the sequence performed in the information delivery method in the fourth embodiment. The example in FIG. 23 illustrates a situation in which the delivery unit 34 transmits data to the smart device 200a by using the plug-in B.

First, when a print request is generated in the application 30, the application 30 transmits the print request including processing target data to the setting unit 32 of the printer driver 31 (Step S131). The printer driver 31 (the converter 33) then sends an inquiry to the delivery unit 34 about the data format information 37 (Step S132).

The delivery unit 34 refers to the plug-in information 35 and identifies enabled plug-ins. It is assumed here that an enabled plug-in is the plug-in B. The delivery unit 34 then sends an inquiry to the plug-in B about the destination identifying information 38b (Step S133). The plug-in B reads out the destination identifying information 38b that the plug-in B itself retains (Step S134). The plug-in B then returns the destination identifying information 38b to the delivery unit 34 (Step S135).

The delivery unit 34 then sends an inquiry to the plug-in B about the data format information 37b (Step S136). The plug-in B then returns the information indicative of PDF format and JPEG format to the delivery unit 34 as the data format information 37b (Step S137).

The delivery unit 34 then returns the PDF format and the JPEG format to the printer driver 31 as the data format information 37b (Step S138). The printer driver 31 (the converter 33) then converts the processing target data included in the print request into the image formats (PDF format and JPEG format) indicated by the data format information 37b received from the delivery unit 34 (Step S139). The printer driver 31 (the converter 33) then transmits the converted image data to the delivery unit 34 (Step S140).

The delivery unit 34 then notifies the plug-in B that the delivery of the image data in PDF format and JPEG format to the destination device (the server 200b) is ready (Step S141). The plug-in B then stands by until a data acquisition request is received from the smart device 200a (Step S142).

The plug-in B then returns status information indicating a stand-by state to the delivery unit 34 (Step S143). The delivery unit 34 then returns the status information indicating a stand-by state to the printer driver 31 (Step S144). The printer driver 31 then returns the status information indicating a stand-by state to the application 30 (Step S145).

Then, the smart device 200a transmits a data acquisition request to the plug-in B (Step S146). The data acquisition request includes a name indicating the type of device (smart device), and the address of the smart device 200a. Then, the plug-in B corresponding to the smart device 200a, upon receiving the data acquisition request from the smart device 200a, transmits the image data in PDF format and JPEG format to the smart device 200a (Step S147).

As in the foregoing, in the fourth embodiment, each of a plurality of plug-ins can deliver one or more pieces of data in response to a data acquisition request received from a device of the device type corresponding to the plug-in.

Any communication method between the information processing apparatus 100 and the device 200 can be used. The communication method between the information processing apparatus 100 and the device 200 is wireless communication, for example.

The invention has an advantageous effect in that it allows a user to transmit data to various devices including a printer by the same unified operation as a printing operation without being conscious of a usable format of data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information delivery system, comprising:
processing circuitry configured to
execute a printer driver to:
receive a data transmission request from an application; and
acquire destination identifying information and data format information from one or more plug-ins of a plurality of plug-ins;
execute the plurality of plug-ins in response to execution of the printer driver, each plug-in of the plurality of plug-ins respectively corresponding to a different destination device of a plurality of destination devices and at least one data format, the at least one data format being usable in a corresponding destination device, and execution of each of the plurality of plug-ins controlling:
storage of data format information that indicates a data format of the at least one data format usable For the corresponding destination device,
storage of one or more pieces of the destination identifying information, the destination identifying information indicating an address of the destination device corresponding to the executed plug-in, and
transmission of data to the destination device corresponding to the executed plug-in;
receive a selection of destination identifying information out of the one or more pieces of destination identifying information;
select a particular plug-in to be used, from the plurality of plug-ins, based on the selected destination identifying information;
convert, using the printer driver, one or more pieces of data into one or more converted pieces of data that are in a data format identified by the data format information corresponding to the particular plug-in; and
deliver, using the particular plug-in, the one or more converted pieces of data to a destination device identified by the selected destination identifying information.

2. The information delivery system according to claim 1, wherein the data transmission request is a print request received from the application.

3. The information delivery system according to claim 1, wherein the processing circuitry is configured to
store plug-in information that indicates whether each of the plug-ins is being enabled, and
acquire the destination identifying information and the data format information from the one or more plug-ins identified by the plug-in information as enabled.

4. The information delivery system according to claim 1, wherein the plurality of destination devices includes at least a printer, a smart device, and a server.

5. The information delivery system according to claim 1, wherein the processing circuitry is configured to
notify the destination device, when the processing circuitry is able to deliver the one or more converted pieces of data, that delivery of the one or more converted pieces of data is ready, and
deliver, in response to a data acquisition request from the destination device, the one or more converted pieces of data to the destination device.

6. The information delivery system according to claim 1, wherein each of the plurality of plug-ins controls storage of the one or more pieces of destination identifying information by receiving, from the corresponding destination device, a device registration request including destination identifying information of the destination device.

7. The information delivery system according to claim 6, wherein the processing circuitry is configured to deliver the one or more converted pieces of data to the destination device in response to a request from the destination device.

8. The information delivery system according to claim 1, wherein each of the plug-ins delivers, when the plug in plug-in receives a data acquisition request from the corresponding destination device, the one or more converted pieces of data to the corresponding destination device.

9. An information processing apparatus, comprising:
processing circuitry configured to
execute a printer driver to:
receive a data transmission request from an application; and
acquire destination identifying information and data format information from one or more plug-ins of a plurality of plug-ins;
execute the plurality of plug-ins in response to execution of the printer driver, each plug-in of the plurality of plug-ins respectively corresponding to a different destination device of a plurality of destination devices and at least one data format, the at least one data format being usable in a corresponding destination device, and
execution of each of the plurality of plug-ins controlling;
storage of data format information that indicates a data format of the at least one data format usable for the corresponding destination device,
storage of one or more pieces of the destination identifying information, the destination identifying information indicating an address of the destination device corresponding to the executed plug-in, and
transmission of data to the destination device corresponding to the executed plug-in;
receive a selection of destination identifying information out of the one or more pieces of destination identifying information;
select a particular plug-in to be used, from the plurality of plug-ins, based on the selected destination identifying information;
convert, using the printer driver, one or more pieces of data into one or more converted pieces of data that are in a data format identified by the data format information corresponding to the particular plug-in; and
deliver, using the particular plug-in, the one or more converted pieces of data to a destination device identified by the selected destination identifying information.

10. An information delivery method, comprising:
executing, by processing circuitry, a printer driver to receive a data transmission request from an application, and to acquire destination identifying information and data format information from one or more plug-ins of a plurality of plug-ins;
executing, by the processing circuitry, the plurality of plug-ins in response to execution of the printer driver, each plug-in of the plurality of plug-ins respectively corresponding to a different destination device of a plurality destination devices and at least one data format, the at least one data format being usable in a corresponding destination device, and
execution of each of the plurality of plug-ins controlling:
storage of data format information that indicates a data format of the at least one data format usable for the corresponding destination device,
storage of one or more pieces of the destination identifying information, the destination identifying information indicating an address of the destination device corresponding to the executed plug-in, and
transmission of data to the destination device corresponding to the executed plug-in;
receiving a selection of destination identifying information out of the one or more pieces of destination identifying information;
selecting a particular plug-in to be used, from the plurality of plug-ins, based on the selected destination identifying information;
converting, by the processing circuitry using the printer driver, one or more pieces of data into one or more converted pieces of data that are in a data format identified by the data format information corresponding to the particular plug-in; and
delivering, by the processing circuitry using the particular plug-in, the one or more converted pieces of data to a destination device identified by the selected destination identifying information.

11. The information delivery method according to claim 10, further comprising:
generating a user interface; and
receiving the data transmission request via the user interface, wherein
the data transmission request is a print request.

12. The information delivery system according to claim 1, wherein
the printer driver generates a user interface, and
the processing circuitry receives a print request via the user interface.

13. The information delivery apparatus according to claim 9, wherein
the printer driver generates a user interface, and
the processing circuitry receives a print request via the user interface.

14. The information delivery apparatus according to claim 9, wherein the data transmission request is a print request received from the application.

15. The information delivery apparatus according to claim 9, wherein the processing circuitry is configured to
store plug-in information that indicates whether each of the plug-ins is being enabled, and acquire the destination identifying information and the data format information from the one or more plug-ins identified by the plug-in information as enabled.

16. The information delivery apparatus according to claim 9, wherein the plurality of destination devices includes at least a printer, a smart device, and a server.

17. The information delivery apparatus according to claim 9, wherein the processing circuitry is configured to
notify the destination device, when the processing circuitry is able to deliver the one or more converted pieces of data, that delivery of the one or more converted pieces of data is ready, and
deliver, in response to a data acquisition request from the destination device, the one or more converted pieces of data to the destination device.

18. The information delivery apparatus according to claim 9, wherein each of the plurality of plug-ins controls storage of the one or more pieces of destination identifying information by receiving, from the corresponding destination device, a device registration request including destination identifying information of the destination device.

19. The information delivery apparatus according to claim 18, wherein the processing circuitry is configured to deliver the one or more converted pieces of data to the destination device in response to a request from the destination device.

20. The information delivery apparatus according to claim 9, wherein each of the plug-ins delivers, when the plug-in receives a data acquisition request from the corresponding destination device, the one or more converted pieces of data to the corresponding destination device.

* * * * *